(12) United States Patent
Ma et al.

(10) Patent No.: US 12,192,488 B2
(45) Date of Patent: *Jan. 7, 2025

(54) VIDEO ENCODER, VIDEO DECODER, AND CORRESPONDING ENCODING AND DECODING METHODS

(71) Applicant: HUAWEI TECHNOLOGIES CO., LTD., Guangdong (CN)

(72) Inventors: Xiang Ma, Moscow (RU); Yin Zhao, Hangzhou (CN); Haitao Yang, Shenzhen (CN); Jianle Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,176

(22) Filed: Apr. 26, 2022

(65) Prior Publication Data
US 2022/0264123 A1    Aug. 18, 2022

Related U.S. Application Data

(63) Continuation of application No. 17/149,726, filed on Jan. 15, 2021, now Pat. No. 11,336,907, which is a continuation of application No. PCT/CN2019/096191, filed on Jul. 16, 2019.
(Continued)

(51) Int. Cl.
*H04N 19/176* (2014.01)
*H04N 19/186* (2014.01)

(52) U.S. Cl.
CPC ......... *H04N 19/186* (2014.11); *H04N 19/176* (2014.11)

(58) Field of Classification Search
CPC .. H04N 19/186; H04N 19/157; H04N 19/176; H04N 19/11; H04N 19/593
See application file for complete search history.

(56) References Cited

U.S. PATENT DOCUMENTS 9,307,237 B2    4/2016    Liu et al.
9,648,330 B2    5/2017    Pu et al.
(Continued)

FOREIGN PATENT DOCUMENTS

CN    104871537 A    8/2015
EP    2920964 B1    5/2018
(Continued)

OTHER PUBLICATIONS

Document: JVET-D1001_v3, Jianle Chen et al., Algorithm Description of Joint Exploration Test Model 4, Joint Video Exploration Team (JVET) of ITU-T SG 16 WP 3 and ISO/IEC JTVC 1/SC 29/WG 11, 4th Meeting: Chengdu, CN, Oct. 15-21, 2016, 39 pages.
(Continued)

*Primary Examiner* — Tsion B Owens

(57) ABSTRACT

Techniques are described of a linear model prediction mode. A set of reconstructed neighboring luma samples are determined. Two pairs of luma value and chroma value are determined according to N reconstructed neighboring luma samples, N reconstructed neighboring chroma samples, M reconstructed neighboring luma samples, and M reconstructed neighboring chroma samples. The minimum value of the N reconstructed neighboring luma samples is not less than the maximum luma value of the remaining reconstructed neighboring luma samples of the set of reconstructed neighboring luma samples. The maximum value of the M reconstructed neighboring luma samples is not larger than the minimum luma value of the remaining reconstructed neighboring luma samples of the set of reconstructed neighboring luma samples. M>1 and N>1. Linear model parameters are determined based on the two pairs of luma value and chroma value, and a predictive block is determined based on the linear model parameters.

20 Claims, 19 Drawing Sheets

Related U.S. Application Data

(60) Provisional application No. 62/698,991, filed on Jul. 17, 2018, provisional application No. 62/698,924, filed on Jul. 16, 2018.

(56) References Cited

U.S. PATENT DOCUMENTS

| | | | |
|---|---|---|---|
| 9,736,335 | B2 | 8/2017 | Tourapis et al. |
| 10,701,402 | B2 | 6/2020 | Baylon et al. |
| 10,939,128 | B2 | 3/2021 | Zhang et al. |
| 10,999,581 | B2 | 5/2021 | Zhang et al. |
| 11,057,642 | B2 | 7/2021 | Zhang et al. |
| 11,172,202 | B2* | 11/2021 | Zhang .................... H04N 19/80 |
| 2007/0253484 | A1 | 11/2007 | Zhao et al. |
| 2014/0233650 | A1 | 8/2014 | Zhang et al. |
| 2016/0277762 | A1* | 9/2016 | Zhang .................. H04N 19/593 |
| 2016/0330477 | A1 | 11/2016 | Kim et al. |
| 2017/0295365 | A1 | 10/2017 | Budagavi et al. |
| 2017/0359597 | A1 | 12/2017 | Budagavi et al. |
| 2018/0063531 | A1 | 3/2018 | Hu et al. |
| 2018/0077426 | A1 | 3/2018 | Zhang et al. |
| 2018/0091825 | A1 | 3/2018 | Zhao et al. |
| 2018/0176594 | A1* | 6/2018 | Zhang .................... H04N 19/59 |
| 2018/0359597 | A1 | 12/2018 | Lazar et al. |
| 2020/0195930 | A1* | 6/2020 | Choi .................... H04N 19/186 |
| 2020/0288135 | A1* | 9/2020 | Laroche ............... H04N 19/105 |
| 2021/0227240 | A1 | 7/2021 | Chen et al. |

FOREIGN PATENT DOCUMENTS

| | | |
|---|---|---|
| KR | 20120140181 A | 12/2012 |
| KR | 20130004133 A | 1/2013 |
| KR | 101461501 B1 | 12/2014 |
| RU | 2463729 C2 | 10/2012 |
| WO | 2017054630 A1 | 4/2017 |
| WO | 2017140211 A1 | 8/2017 |
| WO | 2018053293 A1 | 3/2018 |
| WO | 2018118940 A1 | 6/2018 |
| WO | 2020014563 A1 | 1/2020 |
| WO | 2020015648 A1 | 1/2020 |

OTHER PUBLICATIONS

Document: JVET-J1023_r2, Geert Van der Auwera et al., Description of Core Experiment 3: Intra Prediction and Mode Coding, Joint Video Experts Team (JVET) of ITU-T SG 16 WP 3 and ISO/IEC JTC 1/SC 29/WG 11, 10th Meeting: San Diego, USA, Apr. 10-20, 2018, 50 pages.

Guillaume Laroche, et al., Non-CE3: On cross-component linear model simplification, Joint Video Experts Team (JVET) of ITU-T SG 16 WP 3 and ISO/IEC JTC 1/SC 29/WG 11, JVET-K0204-v1, Jul. 12, 2018.

Alexey Filippov et al., CEI-related: Simplified and robust LIC parameter derivation unified with CCLM, JVET-N0716-v3, Joint Video Experts Team (JVET) of ITU-T SG 16 WP 3 and ISO/IECJTC 1/SC 29/WG11, 14th Meeting: Geneva, CH, 19 Mar. 27, 2019, 8 pages.

Christian Heimrich, Improved robustness for calculation of cross-component linear model parameters, JVET-M0093-v1, Joint Video Experts Team (JVET)of ITU-T SG 16 WP 3 and ISO/IECJTC 1/SC 29/WG11, 13th Meeting: Marrakech, MA, 9 Jan. 18, 2019, 4 pages.

Meng Wang et al., CE3-related: Modified linear model derivation for CCLM modes, JVET-M0274, Joint Video Experts Team (JVET) of ITU-T SG 16 WP 3 and ISO/IECJTC 1/SC 29/WG11, 13th Meeting: Marrakech, MA, 9 Jan. 18, 2019, 3 pages.

Meng Wang et al., CE3-1.5: Cclm derived with four neighbouring samples, JVET-N0271-v2, Joint Video Experts Team (JVET) of ITU-T SG 16 WP 3 and ISO/IECJTC 1/SC 29/WG11, 14th Meeting: Geneva, CH, 19 Mar. 27, 2019, 3 pages.

Guillaume Laroche et al., Non-CE3: On cross-component linear model simplification . Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0204-v3, 7 pages.

Xingyu Zhang et al., CE6.a: New modes (LML and LMA) for chroma intra prediction. Joint Collaborative Team on Video Coding (JCT-VC) of ITU-T SG16 WP3 and ISO/IEC JTC1/SC29/WG11, 8th Meeting: San Jos , CA, USA, 1 Feb. 10, 2012, JCTVC-H0544, 7 pages.

Jianle Chen et al., Algorithm Description of Joint Exploration Test Model 7 (JEM 7). Joint Video Exploration Team (JVET) of ITU-T SG 16 WP 3 and ISO/IEC JTC 1/SC 29/WG 11, 7th Meeting: Torino, IT, 13 Jul. 21, 2017, JVET-G1001-v1, 46 pages.

Kiang Ma et al., CE3: Multi-directional LM (Test 4.2.1, 4.2.2, 4.2.3, 4.2.4). Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0191, 5 pages.

Kiang Ma et al., CE3-related: Improved multi-directional LM. Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0336_r1, 8 pages.

* cited by examiner

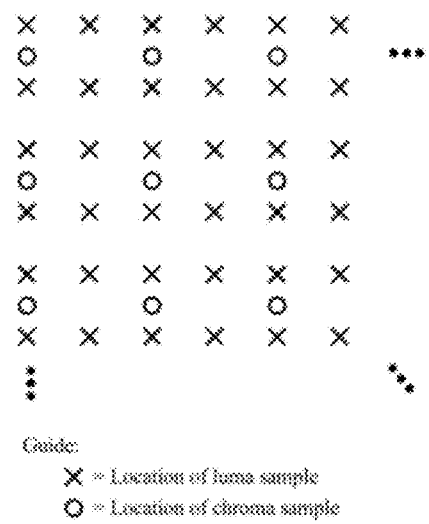
FIG. 8
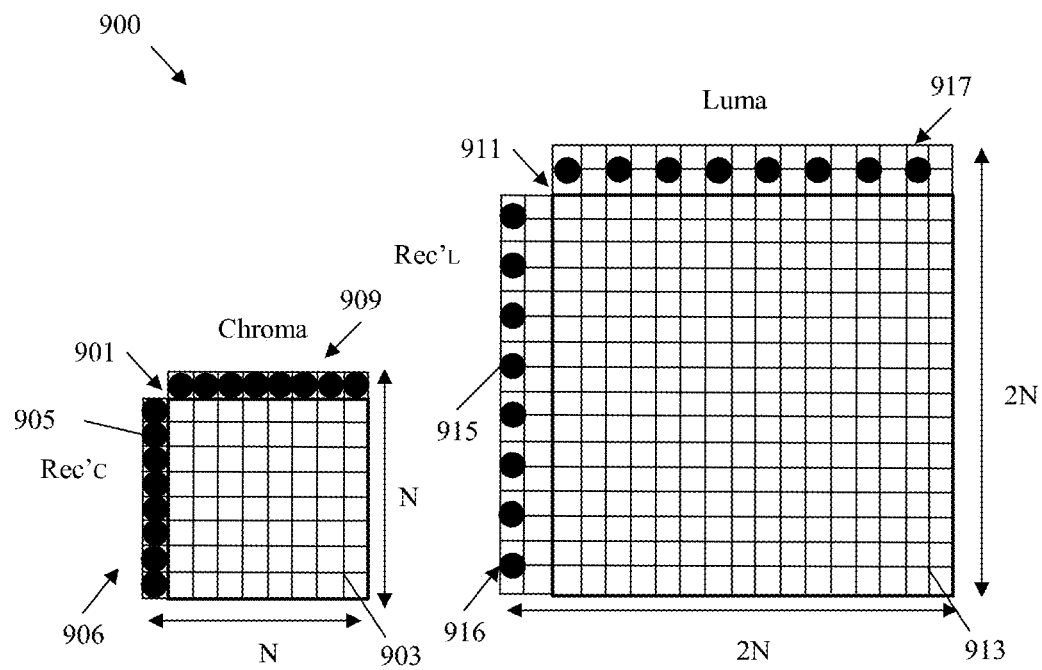
FIG. 9B
FIG. 9A
FIG. 9

VIDEO ENCODER, VIDEO DECODER, AND CORRESPONDING ENCODING AND DECODING METHODS

CROSS-REFERENCE TO RELATED APPLICATIONS

This application is a continuation of U.S. patent application Ser. No. 17/149,726, filed on Jan. 15, 2021, which is a continuation of International Application No. PCT/CN2019/096191, filed on Jul. 16, 2019, The International Application claims priority to U.S. Provisional Patent Application No. 62/698,924, filed on Jul. 16, 2018, and U.S. Provisional Patent Application No. 62/698,991, filed on Jul. 17, 2018. All of the afore-mentioned patent applications are hereby incorporated by reference in their entireties.

TECHNICAL FIELD

Embodiments of the present disclosure are generally related to video data encoding and decoding techniques, and are particularly related to techniques for intra prediction using a cross-component linear model (CCLM).

BACKGROUND

Digital video has been widely used since the introduction of digital versatile disc (DVD). In addition to distributing video programs using DVDs, nowadays video programs can be transmitted using wired computer networks (such as Internet) or wireless communication networks. Before transmitting video data using a transmission medium, the video is encoded. A viewer receives the encoded video and uses a viewing device to decode and display the video. Over the years, the quality of the video has been improved because of higher resolutions, color depths and frame rates, for example. The improved quality in transmitted video data has led into larger data streams, and larger data streams are nowadays commonly transported over the Internet and mobile communication networks.

Higher resolution videos typically require more bandwidth as they carry more information. In order to reduce bandwidth requirements, video coding schemes involving compression of the video have been introduced. When the video is encoded, the bandwidth requirements (or corresponding memory requirements in case of storage) are reduced compared with unencoded video. Often this reduction comes at the cost of quality. Thus, efforts are made in trying to find a balance between bandwidth requirements and quality in the video coding standards.

As there is a continuous need for improving quality and reducing bandwidth requirements, solutions that maintain the quality with reduced bandwidth requirements, or improve the quality while maintaining the bandwidth requirements are continuously sought. Sometimes, compromises between the two may be acceptable. For example, it may be acceptable to increase the bandwidth requirements if the quality improvement is significant.

High efficiency video coding (HEVC) is a commonly known video coding scheme. In HEVC, a coding unit (CU) is split into multiple prediction units (PUs) or transform units (TUs). A next-generation video coding standard, the versatile video coding (VVC) standard, is the most recent joint video coding project of the International Communication Union Telecommunication Standardization Sector (ITU-T) Video Coding Experts Group (VCEG) and the International Organization for Standardization/International Electrotechnical Commission (ISO/IEC) Moving Picture Experts Group (MPEG). The two standardization organizations are working together in a partnership known as the Joint Video Exploration Team (JVET). The VVC standard is also referred to as ITU-T H.266 standard or Next Generation Video Coding (NGVC) standard. In the VVC standard, the concepts of multiple partition types, i.e. the separation of the CU, PU and TU concepts, are removed, except as needed for CUs that have a size too large for the maximum transform length, and the VVC supports more flexibility for CU partition shapes.

SUMMARY

Embodiments of the present application provide apparatuses and methods for encoding and decoding video data. In particular, by using luma samples to predict chroma samples via intra-prediction as part of a video coding mechanism, the intra prediction coding using a cross-component linear model can be achieved in a flexible way.

Particular embodiments are outlined in the attached independent claims, with other embodiments in the dependent claims.

According to a first aspect, the disclosure relates to a method of decoding video data. The method includes the following:
  determining a luma block that corresponds to a chroma block;
  determining a set of down-sampled reconstructed neighboring luma samples, the set of down-sampled reconstructed neighboring luma samples including a plurality of down-sampled reconstructed luma samples that are above the luma block, and/or a plurality of down-sampled reconstructed luma samples that are left to the luma block;
  determining two couples of luma value and chroma value according to N down-sampled reconstructed luma samples with the maximum value and N reconstructed chroma samples that correspond to the N down-sampled reconstructed luma samples with the maximum luma values, and/or M down-sampled reconstructed luma samples with the minimum luma value and M reconstructed chroma samples that correspond to the M down-sampled luma samples with the minimum value, when the N down-sampled reconstructed luma samples with the maximum value and/or the M down-sampled reconstructed luma samples with the minimum value are included in the set of down-sampled reconstructed neighboring luma samples, wherein M, N is a positive integer and larger than 1;
  determining one or more linear model parameters based on the determined two couples of luma value and chroma value;
  determining a predictive block based on the one or more linear model parameters; and
  linear model (LM) prediction decoding the chroma block based on the predictive block, the linear model (LM) prediction including cross-component linear model prediction, multi-directional linear model (MDLM) and MMLM.

In a possible implementation form of the method according to the first aspect as such, the set of down-sampled reconstructed neighboring luma samples further includes:
  a top-right neighboring luma sample outside the luma block and luma samples that are right to the top-right neighboring luma sample outside the luma block; and a left-below neighboring luma sample outside the luma block and luma samples that are below of the left-below neighboring luma sample outside the luma block.

In a possible implementation form of the method according to any preceding implementation of the first aspect or the first aspect as such, the plurality of reconstructed luma samples that are above the luma block are reconstructed neighboring luma samples adjacent to the respective top boundary, and the plurality of reconstructed luma samples that are left to the luma block are reconstructed neighboring luma samples adjacent to the respective left boundary.

In a possible implementation form of the method according to any preceding implementation of the first aspect or the first aspect as such, the set of (down-sampled) reconstructed neighboring luma samples excludes luma samples that are above of a top-left neighboring luma sample outside the luma block, and/or luma samples that are left of the top-left neighboring luma sample outside the luma block.

In a possible implementation form of the method according to any preceding implementation of the first aspect or the first aspect as such, a coordinate of the top-left luma sample of the luma block is $(x_0, y_0)$, and the set of (down-sampled) reconstructed neighboring luma samples excludes luma samples having an x-coordinate less than $x_0$ and a y-coordinate less than $y_0$.

In a possible implementation form of the method according to any preceding implementation of the first aspect or the first aspect as such, when the N down-sampled reconstructed luma samples with the maximum value and/or the M down-sampled reconstructed luma samples with the minimum value are included in the set of down-sampled reconstructed neighboring luma samples, the step of determining two couples of luma value and chroma value, includes:

determining (or selecting) two couples of luma value and chroma value based on chroma value difference between a chroma value of each of a first plurality of couples of luma value and chroma value and a chroma value of each of a second plurality of couples of luma value and chroma value, said each of the first plurality of couples of luma value and chroma value including one of N down-sampled reconstructed luma samples with the maximum value and the corresponding reconstructed neighboring chroma sample, and said each of the second plurality of couples of luma value and chroma value including one of M down-sampled reconstructed luma samples with the minimum value and the corresponding reconstructed neighboring chroma sample.

In a possible implementation form of the method according to any preceding implementation of the first aspect or the first aspect as such, the smallest chroma value difference is between a chroma value of a first couple of luma value and chroma value and a chroma value of a second couple of luma value and chroma value, and the first couple of luma value and chroma value and the second couple of luma value and chroma value which have the smallest chroma value difference is chosen as said two couples of luma value and chroma value; or the largest chroma value difference between a chroma value of a third couple of luma value and chroma value and a chroma value of a fourth couple of luma value and chroma value, and the third couple of luma value and chroma value and the fourth couple of luma value and chroma value which have the largest chroma value difference is chosen as said two couples of luma value and chroma value. For example, the first couple of luma value and chroma value is included in the first plurality of couples of luma value and chroma value. For example, the second couple of luma value and chroma value is included in the second plurality of couples of luma value and chroma value. For example, the third couple of luma value and chroma value is included in the first plurality of couples of luma value and chroma value. For example, the fourth couple of luma value and chroma value is included in the second plurality of couples of luma value and chroma value.

In a possible implementation form of the method according to any preceding implementation of the first aspect or the first aspect as such, when the N down-sampled reconstructed luma samples with the maximum value and/or the M down-sampled reconstructed luma samples with the minimum value are included in the set of down-sampled reconstructed neighboring luma samples, the step of determining two couples of luma value and chroma value, includes:

determining a fifth couple of luma value and chroma value and a sixth couple of luma value and chroma value as said two couples of luma value and chroma value.

The corresponding chroma value of the fifth couple of luma value and chroma value is the mean chroma value of the N reconstructed chroma samples that correspond to the N down-sampled reconstructed luma samples with the maximum value, and the corresponding chroma value of the sixth couple of luma value and chroma value is the mean chroma value of the M reconstructed chroma samples that correspond to the M down-sampled reconstructed luma samples with the minimum value. The luma value of the fifth couple of luma value and chroma value is the luma value of each of the N down-sampled reconstructed luma samples with the maximum value. The luma value of the sixth couple of luma value and chroma value is the luma value of each of the M down-sampled reconstructed luma samples with the minimum value.

In a possible implementation form of the method according to any preceding implementation of the first aspect or the first aspect as such, the set of down-sampled reconstructed neighboring luma samples include a first set of down-sampled reconstructed neighboring luma samples and a second set of down-sampled reconstructed neighboring luma samples, and the first set of down-sampled reconstructed neighboring luma samples includes down-sampled reconstructed neighboring luma samples with the luma value being less than or equal to a threshold; and the second set of down-sampled reconstructed neighboring luma samples includes down-sampled reconstructed neighboring luma samples with the luma value being larger than the threshold.

In a possible implementation form of the method according to any preceding implementation of the first aspect or the first aspect as such, LM prediction decoding the chroma block based on the predictive block includes adding the predictive block to a residual block to reconstruct the chroma block.

In a possible implementation form of the method according to any preceding implementation of the first aspect or the first aspect as such, the method further includes:

decoding a flag for a current block that includes the luma block and the chroma block, wherein the flag indicates that LM prediction coding is enabled for the chroma block, and wherein decoding the flag includes decoding the flag based on a context comprising one or more flags that indicate whether the LM prediction coding is enabled for neighboring blocks.

According to a second aspect, the disclosure relates to a method of decoding video data, the method includes the following:

determining a luma block that corresponds to a chroma block;

determining a set of (down-sampled) reconstructed neighboring luma samples, wherein the set of (down-sampled) reconstructed neighboring luma samples include a plurality of (down-sampled) reconstructed luma samples that are above the luma block, and/or a plurality of (down-sampled) reconstructed luma samples that are left to the luma block;

determining two couples of luma value and chroma value according to N (down-sampled) reconstructed luma samples and N reconstructed chroma samples that correspond to the N (down-sampled) reconstructed luma samples, and/or M (down-sampled) reconstructed luma samples and M reconstructed chroma samples that correspond to the M (down-sampled) luma samples, wherein the minimum value of the N (down-sampled) reconstructed luma samples is not less than the luma value of the remaining (down-sampled) reconstructed luma samples of the set of (down-sampled) reconstructed neighboring luma samples, and the maximum value of the M (down-sampled) reconstructed luma samples is not larger than the luma value of the remaining (down-sampled) reconstructed luma samples of the set of down-sampled reconstructed neighboring luma samples, and M, N is a positive integer and larger than 1 (In other words, the luma value of any one of the N down-sampled reconstructed luma samples is larger than luma value of any one of the M down-sampled reconstructed luma samples and the sum of N and M is equal to or less than the number of the set of down-sampled reconstructed neighboring luma samples);

determining one or more linear model parameters based on the determined two couples of luma value and chroma value;

determining a predictive block based on the one or more linear model parameters; and linear model (LM) prediction decoding the chroma block based on the predictive block.

In a possible implementation form of the method according to the second aspect as such, the step of determining two couples of luma value and chroma value, includes:

determining a seventh couple of luma value and chroma value, and an eighth couple of luma value and chroma value as said two couples of luma value and chroma value, wherein the luma value of the seventh couple of luma value and chroma value is the mean luma value of said N (down-sampled) reconstructed luma samples, and the chroma value of the seventh couple of luma value and chroma value is the mean chroma value of said N reconstructed chroma samples that correspond to the N (down-sampled) reconstructed luma samples; and wherein the luma value of the eighth couple of luma value and chroma value is the mean luma value of said M (down-sampled) reconstructed luma samples, and the chroma value of the eighth couple of luma value and chroma value is the mean chroma value of said M reconstructed chroma samples that correspond to the M (down-sampled) reconstructed luma samples.

In a possible implementation form of the method according to any preceding implementation of the second aspect or the second aspect as such, the step of determining two couples of luma value and chroma value, includes:

determining a ninth couple of luma value and chroma value, and a tenth couple of luma value and chroma value as said two couples of luma value and chroma value, wherein the luma value of the ninth couple of luma value and chroma value is the mean luma value of said N (down-sampled) reconstructed luma samples within a first luma value range, and the chroma value of the ninth couple of luma value and chroma value is the mean chroma value of said N reconstructed chroma samples that correspond to the N (down-sampled) reconstructed luma samples within the first luma value range; and wherein the luma value of the tenth couple of luma value and chroma value is the mean luma value of said M (down-sampled) reconstructed luma samples within a second luma value range, and the chroma value of the tenth couple of luma value and chroma value is the mean chroma value of said M reconstructed chroma samples that correspond to the M (down-sampled) reconstructed luma samples within the second luma value range; wherein any value of the first luma value range is larger than any one of the second luma value range.

In a possible implementation form of the method according to any preceding implementation of the second aspect or the second aspect as such, the first luma value is within a range of [MaxlumaValue-$T_1$, MaxlumaValue]; and/or, the second luma value is within a range of [MinlumaValue, MinlumaValue+$T_2$], wherein the MaxlumaValue and MinlumaValue are respectively the maximum luma value and the minimum luma value in the set of down-sampled reconstructed neighboring luma samples, and $T_1$, $T_2$ are predefined thresholds.

In a possible implementation form of the method according to any preceding implementation of the second aspect or the second aspect as such, M and N are equal, or not equal.

In a possible implementation form of the method according to any preceding implementation of the second aspect or the second aspect as such, M and N are defined based on the block size of the luma block.

In a possible implementation form of the method according to any preceding implementation of the second aspect or the second aspect as such, M=(W+H)>>t, N=(W+H)>>r, wherein t and r are the number of right shift bits.

In a possible implementation form of the method according to any preceding implementation of the second aspect or the second aspect as such, the set of down-sampled reconstructed neighboring luma samples further includes:

a top-right neighboring luma sample outside the luma block and luma samples that are right to the top-right neighboring luma sample outside the luma block; and a left-below neighboring luma sample outside the luma block and luma samples that are below of the left-below neighboring luma sample outside the luma block.

In a possible implementation form of the method according to any preceding implementation of the second aspect or the second aspect as such, the plurality of reconstructed luma samples that are above the luma block are reconstructed neighboring luma samples adjacent to the respective top boundary, and the plurality of reconstructed luma samples that are left to the luma block are reconstructed neighboring luma samples adjacent to the respective left boundary.

In a possible implementation form of the method according to any preceding implementation of the second aspect or the second aspect as such, the set of (down-sampled) reconstructed neighboring luma samples excludes luma samples that are above of a top-left neighboring luma sample outside the luma block, and/or luma samples that are left of the top-left neighboring luma sample outside the luma block.

In a possible implementation form of the method according to any preceding implementation of the second aspect or the second aspect as such, a coordinate of the top-left luma sample of the luma block is $(x_0, y_0)$, and the set of (down-sampled) reconstructed neighboring luma samples excludes luma samples having an x-coordinate less than $x_0$ and a y-coordinate less than $y_0$.

In a possible implementation form of the method according to any preceding implementation of the second aspect or the second aspect as such, the set of down-sampled reconstructed neighboring luma samples include a first set of down-sampled reconstructed neighboring luma samples and a second set of down-sampled reconstructed neighboring luma samples, and the first set of down-sampled reconstructed neighboring luma samples includes down-sampled reconstructed neighboring luma samples with the luma value being less than or equal to a threshold; and the second set of down-sampled reconstructed neighboring luma samples includes down-sampled reconstructed neighboring luma samples with the luma value being larger than the threshold.

According to a third aspect, the disclosure relates to a device for decoding video data, and the device includes:
 a video data memory and a video decoder;
 wherein the video decoder is configured for:
  determining a luma block that corresponds to a chroma block;
  determining a set of (down-sampled) reconstructed neighboring luma samples, wherein the set of (down-sampled) reconstructed neighboring luma samples include a plurality of (down-sampled) reconstructed luma samples that are above the luma block, and/or a plurality of (down-sampled) reconstructed luma samples that are left to the luma block;
  determining two couples of luma value and chroma value according to N down-sampled reconstructed luma samples with the maximum value and N reconstructed chroma samples that correspond to the N down-sampled reconstructed luma samples with the maximum values, and/or M down-sampled reconstructed luma samples with the minimum value and M reconstructed chroma samples that correspond to the M down-sampled luma samples with the minimum value, when the N down-sampled reconstructed luma samples with the maximum value and/or the M down-sampled reconstructed luma samples with the minimum value are included in the set of down-sampled reconstructed neighboring luma samples, wherein M, N is a positive integer and larger than 1;
  determining one or more linear model parameters based on the determined two couples of luma value and chroma value;
  determining a predictive block based on the one or more linear model parameters; and
  linear model (LM) prediction decoding the chroma block based on the predictive block.

In a possible implementation form of the device according to the third aspect as such, the set of down-sampled reconstructed neighboring luma samples further includes:
 a top-right neighboring luma sample outside the luma block and luma samples that are right to the top-right neighboring luma sample outside the luma block; and
 a left-below neighboring luma sample outside the luma block and luma samples that are below of the left-below neighboring luma sample outside the luma block.

In a possible implementation form of the method according to any preceding implementation of the third aspect or the third aspect as such, the plurality of reconstructed luma samples that are above the luma block are reconstructed neighboring luma samples adjacent to the respective top boundary, and the plurality of reconstructed luma samples that are left to the luma block are reconstructed neighboring luma samples adjacent to the respective left boundary.

In a possible implementation form of the method according to any preceding implementation of the third aspect or the third aspect as such, the set of (down-sampled) reconstructed neighboring luma samples excludes luma samples that are above of a top-left neighboring luma sample outside the luma block, and/or luma samples that are left of the top-left neighboring luma sample outside the luma block.

In a possible implementation form of the method according to any preceding implementation of the third aspect or the third aspect as such, a coordinate of the top-left luma sample of the luma block is $(x_0, y_0)$, and the set of (down-sampled) reconstructed neighboring luma samples excludes luma samples having an x-coordinate less than $x_0$ and a y-coordinate less than $y_0$.

In a possible implementation form of the method according to any preceding implementation of the third aspect or the third aspect as such, when the N down-sampled reconstructed luma samples with the maximum value and/or the M down-sampled reconstructed luma samples with the minimum value are included in the set of down-sampled reconstructed neighboring luma samples, in determining two couples of luma value and chroma value, the video decoder is configured for:
 determining (or selecting) two couples of luma value and chroma value based on chroma value difference between a chroma value of each of a first plurality of couples of luma value and chroma value and a chroma value of each of a second plurality of couples of luma value and chroma value, wherein said each of the first plurality of couples of luma value and chroma value includes one of N down-sampled reconstructed luma samples with the maximum value and the corresponding reconstructed neighboring chroma sample, and said each of the second plurality of couples of luma value and chroma value includes one of M down-sampled reconstructed luma samples with the minimum value and the corresponding reconstructed neighboring chroma sample.

In a possible implementation form of the method according to any preceding implementation of the third aspect or the third aspect as such, the smallest chroma value difference between a chroma value of a first couple of luma value and chroma value and a chroma value of a second couple of luma value and chroma value, and the first couple of luma value and chroma value and the second couple of luma value and chroma value which have the smallest chroma value difference is chosen as said two couples of luma value and chroma value; or
 the largest chroma value difference between a chroma value of a third couple of luma value and chroma value and a chroma value of a fourth couple of luma value and chroma value, and the third couple of luma value and chroma value and the fourth couple of luma value and chroma value which have the largest chroma value difference is chosen as said two couples of luma value and chroma value. For example, the first couple of luma value and chroma value is included in the first plurality of couples of luma value and chroma value. For example, the second couple of luma value and chroma value is included in the second plurality of couples of luma value and chroma value. For example, the third couple of luma value and chroma value is included in the first plurality of couples of luma value and chroma value. For example, the fourth couple of luma value and chroma value is included in the second plurality of couples of luma value and chroma value.

In a possible implementation form of the method according to any preceding implementation of the third aspect or the third aspect as such, when the N down-sampled reconstructed luma samples with the maximum value and/or the M down-sampled reconstructed luma samples with the minimum value are included in the set of down-sampled reconstructed neighboring luma samples, in determining two couples of luma value and chroma value, the video decoder is configured for:

determining a fifth couple of luma value and chroma value and a sixth couple of luma value and chroma value as said two couples of luma value and chroma value.

The corresponding chroma value of the fifth couple of luma value and chroma value is the mean chroma value of the N reconstructed chroma samples that correspond to N down-sampled reconstructed luma samples with the maximum value, and the corresponding chroma value of the sixth couple of luma value and chroma value is the mean chroma value of the M reconstructed chroma samples that correspond to M down-sampled reconstructed luma samples with the minimum value. The luma value of the fifth couple of luma value and chroma value is the luma value of each of the N down-sampled reconstructed luma samples with the maximum value. The luma value of the sixth couple of luma value and chroma value is the luma value of each of the M down-sampled reconstructed luma samples with the minimum value.

In a possible implementation form of the method according to any preceding implementation of the third aspect or the third aspect as such, the set of down-sampled reconstructed neighboring luma samples include a first set of down-sampled reconstructed neighboring luma samples and a second set of down-sampled reconstructed neighboring luma samples, and wherein the first set of down-sampled reconstructed neighboring luma samples includes down-sampled reconstructed neighboring luma samples with the luma value being less than or equal to a threshold; and the second set of down-sampled reconstructed neighboring luma samples includes down-sampled reconstructed neighboring luma samples with the luma value being larger than the threshold.

In a possible implementation form of the method according to any preceding implementation of the third aspect or the third aspect as such, to LM prediction decode the chroma block based on the predictive block, the video decoder is configured to add the predictive block to a residual block to reconstruct the chroma block.

In a possible implementation form of the method according to any preceding implementation of the third aspect or the third aspect as such, the video decoder is configured for:

decoding a flag for a current block that includes the luma block and the chroma block, wherein the flag indicates that LM prediction coding is enabled for the chroma block, and wherein decoding the flag includes decoding the flag based on a context comprising one or more flags that indicate whether the LM prediction coding is enabled for neighboring blocks.

According to a fourth aspect, the disclosure relates to a device for decoding video data, and the device includes:

a video data memory, and a video decoder;

The video decoder is configured for:

determining a luma block that corresponds to a chroma block;

determining a set of (down-sampled) reconstructed neighboring luma samples, wherein the set of (down-sampled) reconstructed neighboring luma samples include a plurality of (down-sampled) reconstructed luma samples that are above the luma block, and/or a plurality of (down-sampled) reconstructed luma samples that are left to the luma block;

determining two couples of luma value and chroma value according to N (down-sampled) reconstructed luma samples and N reconstructed chroma samples that correspond to the N (down-sampled) reconstructed luma samples, and/or M (down-sampled) reconstructed luma samples and M reconstructed chroma samples that correspond to the M (down-sampled) luma samples, wherein the minimum value of the N (down-sampled) reconstructed luma samples is not less than the luma value of the remaining (down-sampled) reconstructed luma samples of the set of (down-sampled) reconstructed neighboring luma samples, and the maximum value of the M (down-sampled) reconstructed luma samples is not larger than the luma value of the remaining (down-sampled) reconstructed luma samples of the set of down-sampled reconstructed neighboring luma samples, and M, N is a positive integer and larger than 1 (in other words, the luma value of any one of the N down-sampled reconstructed luma samples is larger than luma value of any one of the M down-sampled reconstructed luma samples and the sum of N and M is equal to or less than the number of the set of down-sampled reconstructed neighboring luma samples);

determining one or more linear model parameters based on the determined two couples of luma value and chroma value;

determining a predictive block based on the one or more linear model parameters; and linear model (LM) prediction decoding the chroma block based on the predictive block.

In a possible implementation form of the method according to the fourth aspect as such, in determining two couples of luma value and chroma value, the video decoder is configured for:

determining a seventh couple of luma value and chroma value, and a eighth couple of luma value and chroma value as said two couples of luma value and chroma value.

The luma value of the seventh couple of luma value and chroma value is the mean luma value of said N (down-sampled) reconstructed luma samples, and the chroma value of the seventh couple of luma value and chroma value is the mean chroma value of said N reconstructed chroma samples that correspond to the N (down-sampled) reconstructed luma samples.

The luma value of the eighth couple of luma value and chroma value is the mean luma value of said M (down-sampled) reconstructed luma samples, and the chroma value of the eighth couple of luma value and chroma value is the mean chroma value of said M reconstructed chroma samples that correspond to the M (down-sampled) reconstructed luma samples.

In a possible implementation form of the method according to any preceding implementation of the fourth aspect or the fourth aspect as such, in determining two couples of luma value and chroma value, the video decoder is configured for:
  determining a ninth couple of luma value and chroma value, and a tenth couple of luma value and chroma value as said two couples of luma value and chroma value.

The luma value of the ninth couple of luma value and chroma value is the mean luma value of said N (down-sampled) reconstructed luma samples within a first luma value range, and the chroma value of the ninth couple of luma value and chroma value is the mean chroma value of said N reconstructed chroma samples that correspond to the N (down-sampled) reconstructed luma samples within the first luma value range.

The luma value of the tenth couple of luma value and chroma value is the mean luma value of said M (down-sampled) reconstructed luma samples within a second luma value range, and the chroma value of the tenth couple of luma value and chroma value is the mean chroma value of said M reconstructed chroma samples that correspond to the M (down-sampled) reconstructed luma samples within the second luma value range. Any value of the first luma value range is larger than any one of the second luma value range.

In a possible implementation form of the method according to any preceding implementation of the fourth aspect or the fourth aspect as such, the first luma value is within a range of [MaxlumaValue-$T_1$, MaxlumaValue]; and/or, the second luma value is within a range of [MinlumaValue, MinlumaValue+$T_2$], wherein the MaxlumaValue and MinlumaValue are respectively the maximum luma value and the minimum luma value in the set of down-sampled reconstructed neighboring luma samples, and $T_1$, $T_2$ are predefined thresholds.

In a possible implementation form of the method according to any preceding implementation of the fourth aspect or the fourth aspect as such, M and N are equal, or not equal.

In a possible implementation form of the method according to any preceding implementation of the fourth aspect or the fourth aspect as such, M and N are defined based on the block size of the luma block.

In a possible implementation form of the method according to any preceding implementation of the fourth aspect or the fourth aspect as such, M=(W+H)>>t, N=(W+H)>>r, wherein t and r are the number of right shift bits.

In a possible implementation form of the method according to any preceding implementation of the fourth aspect or the fourth aspect as such, the set of down-sampled reconstructed neighboring luma samples further includes:
  a top-right neighboring luma sample outside the luma block and luma samples that are right to the top-right neighboring luma sample outside the luma block; and
  a left-below neighboring luma sample outside the luma block and luma samples that are below of the left-below neighboring luma sample outside the luma block.

In a possible implementation form of the method according to any preceding implementation of the fourth aspect or the fourth aspect as such, the plurality of reconstructed luma samples that are above the luma block are reconstructed neighboring luma samples adjacent to the respective top boundary, and the plurality of reconstructed luma samples that are left to the luma block are reconstructed neighboring luma samples adjacent to the respective left boundary.

In a possible implementation form of the method according to any preceding implementation of the fourth aspect or the fourth aspect as such, the set of (down-sampled) reconstructed neighboring luma samples excludes luma samples that are above of a top-left neighboring luma sample outside the luma block, and/or luma samples that are left of the top-left neighboring luma sample outside the luma block.

In a possible implementation form of the method according to any preceding implementation of the fourth aspect or the fourth aspect as such, a coordinate of the top-left luma sample of the luma block is ($x_0$, $y_0$), and wherein the set of (down-sampled) reconstructed neighboring luma samples excludes luma samples having an x-coordinate less than $x_0$ and a y-coordinate less than $y_0$.

In a possible implementation form of the method according to any preceding implementation of the fourth aspect or the fourth aspect as such, the set of down-sampled reconstructed neighboring luma samples include a first set of down-sampled reconstructed neighboring luma samples and a second set of down-sampled reconstructed neighboring luma samples, and the first set of down-sampled reconstructed neighboring luma samples includes down-sampled reconstructed neighboring luma samples with the luma value being less than or equal to a threshold; and the second set of down-sampled reconstructed neighboring luma samples includes down-sampled reconstructed neighboring luma samples with the luma value being larger than the threshold.

In a possible implementation form of the method according to any preceding implementation of the fourth aspect or the fourth aspect as such, to LM prediction decode the chroma block based on the predictive block, the video decoder is configured to add the predictive block to a residual block to reconstruct the chroma block.

In a possible implementation form of the method according to any preceding implementation of the fourth aspect or the fourth aspect as such, the video decoder is configured to:
  decode a flag for a current block that includes the luma block and the chroma block, wherein the flag indicates that LM prediction coding is enabled for the chroma block, and wherein decoding the flag includes decoding the flag based on a context comprising one or more flags that indicate whether the LM prediction coding is enabled for neighboring blocks.

The method according to the first aspect can be performed by the apparatus according to the third aspect. Further features and implementation forms of the apparatus according to the third aspect correspond to the features and implementation forms of the method according to the first aspect.

The method according to the second aspect can be performed by the apparatus according to the fourth aspect. Further features and implementation forms of the apparatus according to the fourth aspect correspond to the features and implementation forms of the method according to the second aspect.

According to a fifth aspect, the disclosure relates to a method of encoding video data, and the method includes the following:
  determining a luma block that corresponds to a chroma block;
  determining a set of down-sampled reconstructed neighboring luma samples, wherein the set of down-sampled reconstructed neighboring luma samples include a plurality of down-sampled reconstructed luma samples that are above the luma block, and/or a plurality of down-sampled reconstructed luma samples that are left to the luma block;

determining two couples of luma value and chroma value according to N down-sampled reconstructed luma samples with the maximum value and N reconstructed chroma samples that correspond to the N down-sampled reconstructed luma samples with the maximum luma values, and/or M down-sampled reconstructed luma samples with the minimum value and M reconstructed chroma samples that correspond to the M down-sampled luma samples with the minimum luma value, when the N down-sampled reconstructed luma samples with the maximum luma value and/or the M down-sampled reconstructed luma samples with the minimum luma value are included in the set of down-sampled reconstructed neighboring luma samples, wherein M, N is a positive integer and larger than 1;

determining one or more linear model parameters based on the determined two couples of luma value and chroma value;

determining a predictive block based on the one or more linear model parameters; and linear model (LM) prediction encoding the chroma block based on the predictive block.

According to a sixth aspect, the disclosure relates to a method of encoding video data, and the method includes the following:

determining a luma block that corresponds to a chroma block;

determining a set of (down-sampled) reconstructed neighboring luma samples, wherein the set of (down-sampled) reconstructed neighboring luma samples include a plurality of (down-sampled) reconstructed luma samples that are above the luma block, and/or a plurality of (down-sampled) reconstructed luma samples that are left to the luma block;

determining two couples of luma value and chroma value according to N (down-sampled) reconstructed luma samples and N reconstructed chroma samples that correspond to the N (down-sampled) reconstructed luma samples, and/or M (down-sampled) reconstructed luma samples and M reconstructed chroma samples that correspond to the M (down-sampled) luma samples, wherein the minimum value of the N (down-sampled) reconstructed luma samples is not less than the luma value of the remaining (down-sampled) reconstructed luma samples of the set of (down-sampled) reconstructed neighboring luma samples, and the maximum value of the M (down-sampled) reconstructed luma samples is not larger than the luma value of the remaining (down-sampled) reconstructed luma samples of the set of down-sampled reconstructed neighboring luma samples, and M, N is a positive integer and larger than 1; in other words, the luma value of any one of the N down-sampled reconstructed luma samples is larger than luma value of any one of the M down-sampled reconstructed luma samples and the sum of N and M is equal to or less than the number of the set of down-sampled reconstructed neighboring luma samples.

determining one or more linear model parameters based on the determined two couples of luma value and chroma value;

determining a predictive block based on the one or more linear model parameters; and linear model (LM) prediction encoding the chroma block based on the predictive block.

According to a seventh aspect, the disclosure relates to a device for encoding video data, and the device includes:

a video data memory and a video encoder;

wherein the video encoder is configured for:

determining a luma block that corresponds to a chroma block;

determining a set of down-sampled reconstructed neighboring luma samples, wherein the set of down-sampled reconstructed neighboring luma samples include a plurality of down-sampled reconstructed luma samples that are above the luma block, and/or a plurality of down-sampled reconstructed luma samples that are left to the luma block;

determining two couples of luma value and chroma value according to N down-sampled reconstructed luma samples with the maximum value and N reconstructed chroma samples that correspond to the N down-sampled reconstructed luma samples with the maximum values, and/or M down-sampled reconstructed luma samples with the minimum value and M reconstructed chroma samples that correspond to the M down-sampled luma samples with the minimum value, when the N down-sampled reconstructed luma samples with the maximum value and/or the M down-sampled reconstructed luma samples with the minimum value are included in the set of down-sampled reconstructed neighboring luma samples, wherein M, N is a positive integer and larger than 1;

determining one or more linear model parameters based on the determined two couples of luma value and chroma value;

determining a predictive block based on the one or more linear model parameters; and linear model (LM) prediction encoding the chroma block based on the predictive block.

According to an eighth aspect, the disclosure relates to a device for encoding video data, and the device includes:

a video data memory and a video encoder;

wherein the video encoder is configured for:

determining a luma block that corresponds to a chroma block;

determining a set of (down-sampled) reconstructed neighboring luma samples, wherein the set of (down-sampled) reconstructed neighboring luma samples include a plurality of (down-sampled) reconstructed luma samples that are above the luma block, and/or a plurality of (down-sampled) reconstructed luma samples that are left to the luma block;

determining two couples of luma value and chroma value according to N (down-sampled) reconstructed luma samples and N reconstructed chroma samples that correspond to the N (down-sampled) reconstructed luma samples, and/or M (down-sampled) reconstructed luma samples and M reconstructed chroma samples that correspond to the M (down-sampled) luma samples, wherein the minimum value of the N (down-sampled) reconstructed luma samples is not less than the luma value of the remaining (down-sampled) reconstructed luma samples of the set of (down-sampled) reconstructed neighboring luma samples, and the maximum value of the M (down-sampled) reconstructed luma samples is not larger than the luma value of the remaining (down-sampled) reconstructed luma samples of the set of down-sampled reconstructed neighboring luma samples, and M, N is a positive integer and larger than 1;

determining one or more linear model parameters based on the determined two couples of luma value and chroma value;

determining a predictive block based on the one or more linear model parameters; and linear model (LM) prediction encoding the chroma block based on the predictive block.

The encoding device according to any preceding aspect can be further extended by the features of the encoding method according to the corresponding preceding aspect or the implementations thereof to derive further implementations of the encoding apparatus according to the any preceding aspect.

The encoding method according to any preceding aspect can be further extended by the features of the decoding method according to the corresponding preceding aspect or the implementations thereof to derive further implementations of the encoding method according to the any preceding aspect.

A computer readable medium storing instructions which when executed on a processor cause the processor to perform any above method according to any preceding implementation of the any preceding aspect or the any preceding aspect as such.

A decoding apparatus is provided, which includes modules (or units, components, circuits) to perform at least a part of the steps of the above method according to any preceding implementation of the any preceding aspect or the any preceding aspect as such.

A decoding apparatus is provided, which includes a memory storing instructions and a processor coupled to the memory. The processor is configured to execute the instructions stored in the memory to cause the apparatus to perform the above method according to any preceding implementation of the any preceding aspect or the any preceding aspect as such.

A computer-readable storage medium is provided, which having a program recorded thereon. A computer executes the program to perform a method according to any preceding implementation of the any preceding aspect or the any preceding aspect as such.

A computer program is provided, which is configured to cause a computer to execute method according to any preceding implementation of the any preceding aspect or the any preceding aspect as such.

For the purpose of clarity, any one of the foregoing embodiments may be combined with any one or more of the other foregoing embodiments, to create a new embodiment within the scope of the present disclosure.

These and other features will be more clearly understood from the following detailed description taken in conjunction with the accompanying drawings and claims.

BRIEF DESCRIPTION OF THE DRAWINGS

The following is a brief description of accompanying drawings used in describing the embodiments of the present application.

FIG. 8 is a conceptual diagram illustrating nominal vertical and horizontal relative locations of luma and chroma samples.

FIG. 9, which includes FIG. 9A and FIG. 9B, shows schematic diagrams illustrating an example mechanism of performing cross-component linear model (CCLM) intra-prediction. FIG. 9A illustrates an example of neighboring reconstructed pixels of a co-located luma block. FIG. 9B illustrates an example of neighboring reconstructed pixels of a chroma block.

In the various figures, identical reference numbers will be used for identical or functionally equivalent features.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
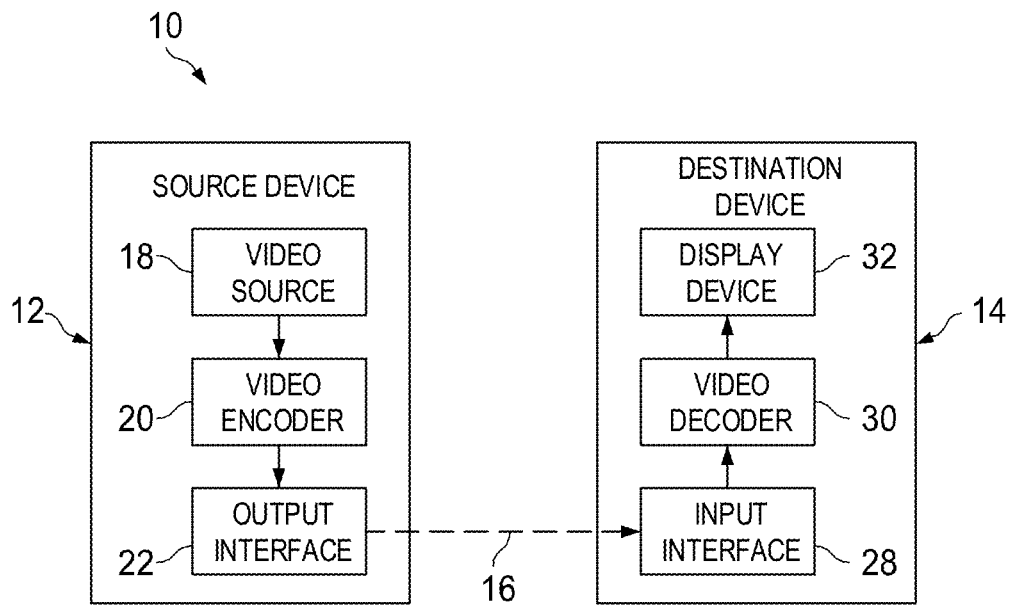
FIG. 1A is a block diagram of a video data coding system in which various embodiments of the present disclosure may be implemented.

FIG. 1A is a block diagram of a video data coding system in which embodiments of the present disclosure may be implemented. As shown in FIG. 1A, the coding system 10 includes a source device 12 that provides encoded video data, and a destination device 14 that decodes the encoded video data provided by the encoding device 12. In particular, the source device 12 may provide the video data to destination device 14 via a transport medium 16. Source device 12 and destination device 14 may be any of a wide range of electronic devices, such as desktop computers, notebook computers (i.e. laptop computers), tablet computers, set-top boxes, cellular telephone handsets (i.e. "smart" phones), televisions, cameras, display devices, digital media players, video gaming consoles, video streaming device, or the like. In some cases, source device 12 and destination device 14 may be equipped for wireless communication.

Destination device 14 may receive the encoded video data via a transport medium 16. The transport medium 16 may be any type of medium or device capable of transporting the encoded video data from source device 12 to destination device 14. In one example, the transport medium 16 may be a communication medium enabling the source device 12 to transmit encoded video data directly to the destination device 14 in real-time. The encoded video data may be modulated according to a communication standard, such as a wireless communication protocol, and the modulated encoded video data is transmitted to the destination device 14. The communication medium may be any wireless or wired communication medium, such as a radio frequency (RF) spectrum wave or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the source device 12, encoded data may be output from an output interface 22 to a storage device (not shown in FIG. 1A). Similarly, encoded data may be accessed from the storage device by an input interface 28 of the destination device 14. The storage device may include any of a variety of distributed or locally accessed data storage media such as hard drives, Blu-Ray™ discs, digital video disks (DVDs), Compact Disc Read-Only Memories (CD-ROMs), flash memories, volatile or non-volatile memories, or any other suitable digital storage media for storing encoded video data.

In a further example, the storage device may correspond to a file server or another intermediate storage device that may store the encoded video generated by the source device 12. The destination device 14 may access stored video data from the storage device via streaming or downloading. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. The destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, the coding system 10 may be configured to support one-way or two-way video transmission to support applications such as video streaming, video playback, video broadcasting, and/or video telephony.

In the example of FIG. 1A, the source device 12 includes a video source 18, a video encoder 20, and an output interface 22. The destination device 14 includes an input interface 28, a video decoder 30, and a display device 32. In accordance with this disclosure, the video encoder 20 of the source device 12 and/or the video decoder 30 of the destination device 14 may be configured to apply the techniques for bidirectional prediction. In other examples, the source device 12 and the destination device 14 may include other components or arrangements. For example, the source device 12 may receive video data from an external video source, such as an external camera. Likewise, the destination device 14 may interface with an external display device, rather than including an integrated display device.

The illustrated coding system 10 of FIG. 1A is merely an example. Methods for bidirectional prediction may be performed by any digital video encoding or decoding device. Although the techniques of this disclosure generally are used by a video coding device, the techniques may also be used by a video encoder/decoder, which is typically referred to as a "codec." Moreover, the techniques of this disclosure may also be used by a video preprocessor. The video encoder and/or the video decoder may be a graphics processing unit (GPU) or a similar device.

The source device 12 and the destination device 14 are merely examples of encoding/decoding devices in a video data coding system in which the source device 12 generates encoded video data for transmission to the destination device 14. In some examples, the source device 12 and the destination device 14 may operate in a substantially symmetrical manner such that each of the source device 12 and the destination devices 14 includes video encoding and decoding components. Hence, the coding system 10 may support one-way or two-way video transmission between video devices 12 and 14, e.g., for video streaming, video playback, video broadcasting, or video telephony.

The video source 18 of the source device 12 may include a video capture device, such as a video camera, a video archive containing previously captured videos, and/or a video feed interface to receive a video from a video content provider. As a further alternative, the video source 18 may generate computer graphics-based data as the source video, or a combination of live video, archived video, and computer-generated video.

In some cases, when the video source 18 is a video camera, the source device 12 and the destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder 20. The encoded video information may then be output by the output interface 22 onto the transport medium 16.

The transport medium 16 may include transient media, such as a wireless broadcast or wired network transmission, or storage media (that is, non-transitory storage media), such as a hard disk, flash drive, compact disc, digital video disc, Blu-Ray™ disc, or other computer-readable media. In some examples, a network server (not shown) may receive encoded video data from the source device 12 and provide the encoded video data to the destination device 14, e.g., via network transmission. Similarly, a computing device of a medium production facility, such as a disc stamping facility, may receive encoded video data from the source device 12 and produce a disc containing the encoded video data. Therefore, the transport medium 16 may be understood to include one or more computer-readable media of various forms, in various examples.

The input interface 28 of the destination device 14 receives information from the transport medium 16. The information of the transport medium 16 may include syntax information defined by the video encoder 20, which is also used by the video decoder 30, that includes syntax elements that describe characteristics and/or processing of blocks and other coded units, e.g., group of pictures (GOPs). The display device 32 displays the decoded video data to a user, and may include any of a variety of display devices such as a cathode ray tube (CRT), a liquid crystal display (LCD), a plasma display, an organic light emitting diode (OLED) display, or other types of display devices.

The video encoder 20 and the video decoder 30 may operate according to a video coding standard, such as the High Efficiency Video Coding (HEVC) standard presently under development, and may conform to a HEVC Test Model (HM). Alternatively, the video encoder 20 and the video decoder 30 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques provided by this disclosure, however, are not limited to any particular coding standard. Other examples of video coding standards include MPEG-2 and ITU-T H.263. Although not shown in FIG. 1A, in some aspects, the video encoder 20 and the video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, the MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device. A device including the video encoder 20 and/or the video decoder 30 may be an integrated circuit, a microprocessor, and/or a wireless communication device, such as a cellular telephone.

Figure 1B:
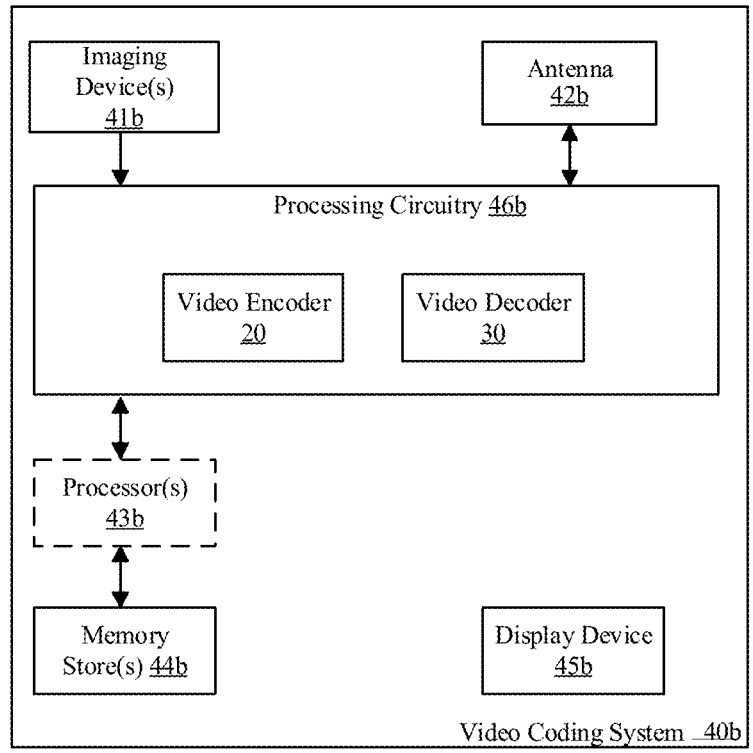
FIG. 1B is a block diagram of another video data coding system in which various embodiments of the present disclosure may be implemented.

FIG. 1B is a block diagram of an example video coding system 40b, which includes the video encoder 20 and/or the decoder 30. As shown in FIG. 1B, the video coding system 40b may include one or more imaging device(s) 41b, the video encoder 20, the video decoder 30, an antenna 42b, one or more processor(s) 43b, one or more memory store(s) 44b, and may further include a display device 45b.

As illustrated, the imaging device(s) 41b, the antenna 42b, the processing circuitry 46b, the video encoder 20, the video decoder 30, the processor(s) 43b, the memory store(s) 44b, and the display device 45b may communicate with one another. Although illustrated with both the video encoder 20 and the video decoder 30, the video coding system 40b may include only the video encoder 20 or only the video decoder 30 in various examples.

In some examples, the antenna 42b of the video coding system 40b may be configured to transmit or receive an encoded bitstream of video data. Furthermore, in some examples, the display device 45b of the video coding system 40b may be configured to present video data. In some examples, the processing circuitry 46b of the video coding system 40b may be implemented via processing unit(s). The processing unit(s) may include application-specific integrated circuit (ASIC) logic, graphics processor(s), general purpose processor(s), or the like. The video coding system 40 may also include optional processor(s) 43b, which may similarly include application-specific integrated circuit (ASIC) logic, graphics processor(s), general purpose processor(s), or the like. In some examples, the processing circuitry 46b may be implemented via hardware, video coding dedicated hardware, or the like. In addition, the memory store(s) 44b may be any type of memory such as volatile memory (e.g., Static Random Access Memory (SRAM), Dynamic Random Access Memory (DRAM), etc.) or non-volatile memory (e.g., flash memory, etc.), and so forth. In one example, memory store(s) 44b may be implemented by cache memory. In some examples, the processing circuitry 46b may access memory store(s) 44b (for implementation of an image buffer for example). In other examples, the processing circuitry 46b may include memory stores (e.g., cache or the like) for the implementation of an image buffer or the like.

Figure 2:
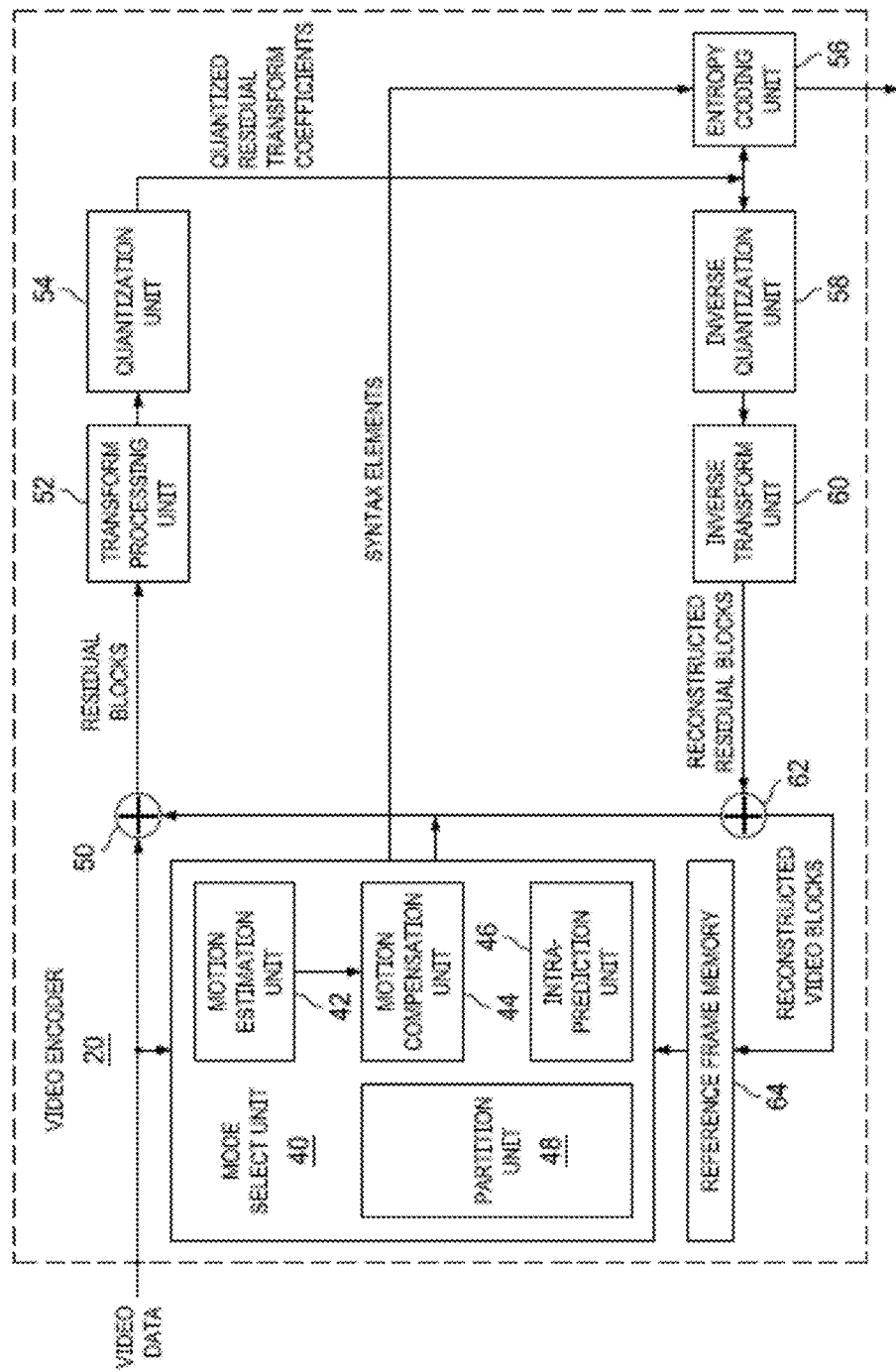
FIG. 2 is a block diagram of a video data encoder in which various embodiments of the present disclosure may be implemented.

In some examples, the video encoder 20 implemented via processing circuitry may embody the various modules as discussed with respect to FIG. 2 and/or any other encoder system or subsystem described herein. The processing circuitry may be configured to perform the various operations as discussed herein.

Figure 3:
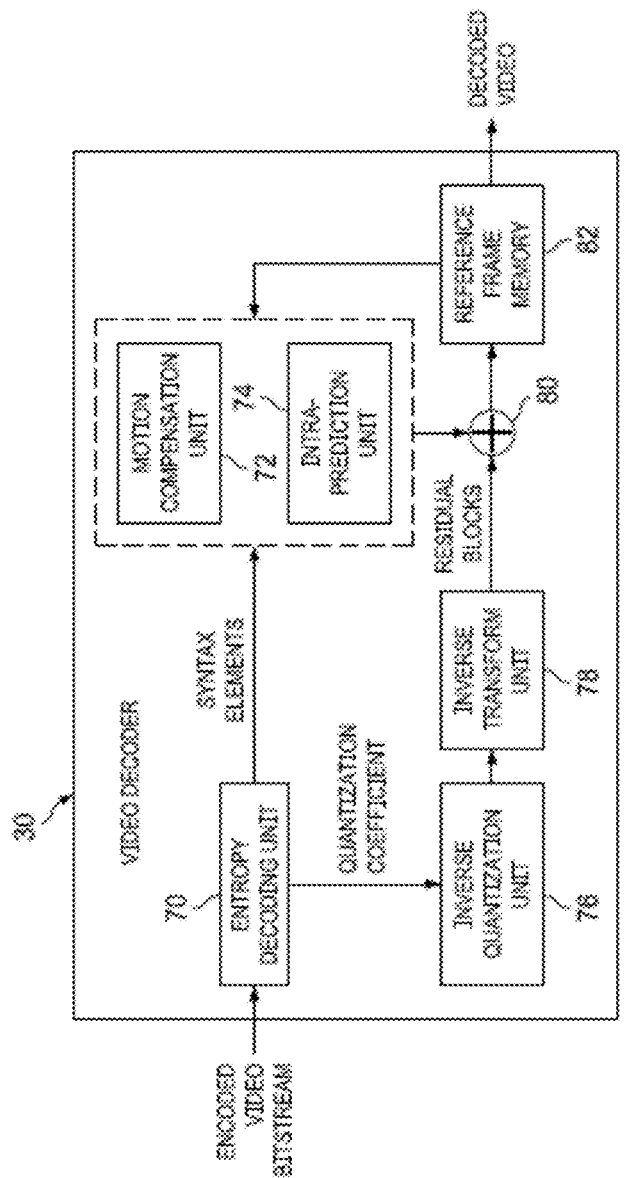
FIG. 3 is a block diagram of a video data decoder in which various embodiments of the present disclosure may be implemented.

Video decoder 30 may be implemented in a similar manner as implemented via the processing circuitry 46 to embody the various modules as discussed with respect to decoder 30 of FIG. 3 and/or any other decoder system or subsystem described herein.

In some examples, the antenna 42b of the video coding system 40b may be configured to receive an encoded bitstream of video data. The encoded bitstream may include data, indicators or the like associated with encoding a video frame. The video coding system 40b may also include video decoder 30 coupled to antenna 42b and configured to decode the encoded bitstream. Display device 45b is configured to present video frames.

FIG. 2 is a block diagram illustrating an example of video encoder 20 that may implement the techniques of the present application. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, adder 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and adder 62. A deblocking filter (not shown in FIG. 2) may also be included to filter block boundaries to remove blockiness artifacts from reconstructed video. If desired, the deblocking filter would typically filter the output of adder 62. Additional filters (in loop or post loop) may also be used in addition to the deblocking filter. Such filters are not shown for brevity, but if desired, may filter the output of adder 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quadtree data structure indicative of partitioning of a LCU into sub-CUs. Leaf-node CUs of the quadtree may include one or more prediction units (PUs) and one or more transform units (TUs).

In the present disclosure, the term "block" is used to refer to any of a coding unit (CU), a prediction unit (PU), or a transform unit (TU), in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is rectangular in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ depending on whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. In an embodiment, a CU, PU, or TU can be square or non-square (e.g., rectangular) in shape.

Mode select unit 40 may select one of the coding modes, intra or inter, e.g., based on error results, and provides the resulting intra- or inter-coded block to an adder 50 to generate residual block data and to an adder 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame (or a picture) relative to a predictive block within a reference frame (or other coded unit), or may indicate the displacement of a PU of a video block within a current video frame (or a picture) relative to a coded block within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (e.g. List 0) or a second reference picture list (e.g. List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Adder 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Adder 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Adder 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Other structural variations of the video encoder 20 can be used to encode the video stream. For example, a non-transform based encoder 20 can quantize the residual signal directly without the transform processing unit 52 for certain blocks or frames. In another implementation, an encoder 20 can have the quantization unit 54 and the inverse quantization unit 58 combined into a single unit.

FIG. 3 is a block diagram illustrating an example of video decoder 30 that may implement the techniques of this present application. In the example of FIG. 3, video decoder 30 includes an entropy decoding unit 70, motion compensation unit 72, intra-prediction unit 74, inverse quantization unit 76, inverse transformation unit 78, reference frame memory 82, and adder 80. Video decoder 30 may, in some examples, perform a decoding pass generally reciprocal to the encoding pass described with respect to video encoder 20 (as shown in FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, e.g. List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

As will be appreciated by those skilled in the art, the coding system 10 of FIG. 1A is suitable for implementing various video coding or compression techniques. Some video compression techniques, such as inter prediction, intra prediction, and/or loop filters, will be discussed later. Therefore, the video compression techniques have been adopted into various video coding standards, such as H.264/AVC and H.265/HEVC.

Various coding tools such as adaptive motion vector prediction (AMVP) and merge mode (MERGE) are used to predict motion vectors (MVs) and enhance inter prediction efficiency and, therefore, the overall video compression efficiency.

Other variations of the video decoder 30 can be used to decode the compressed bitstream. For example, the decoder 30 can produce the output video stream without the loop filtering unit. For example, a non-transform based decoder 30 can inverse-quantize the residual signal directly without the inverse-transform processing unit 78 for certain blocks or frames. In another implementation, the video decoder 30 can have the inverse-quantization unit 76 and the inverse-transform processing unit 78 combined into a single unit.

Figure 4:
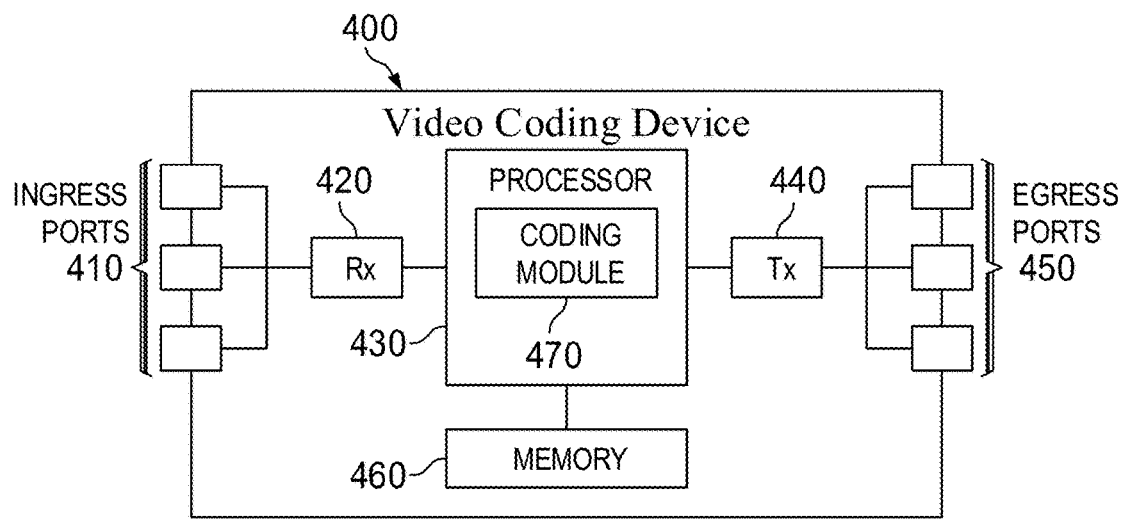
FIG. 4 is a block diagram of a video coding device according to an embodiment of the present disclosure.

FIG. 4 is a schematic diagram of a video coding device according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. In an embodiment, the video coding device 400 may be one or more components of the video decoder 30 of FIG. 1A or the video encoder 20 of FIG. 1A as described above.

The video coding device 400 includes ingress ports 410 and receiver units (Rx) 420 for receiving data, a processor 430 (which may be a logic unit, or a central processing unit (CPU)) for processing the data, transmitter units (Tx) 440 and egress ports 450 for transmitting the data, and a memory 460 for storing the data. The video coding device 400 may also include optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and/or software. The processor 430 may be implemented as one or more CPU chips, cores (e.g., as a multi-core processor), FPGAs, ASICs, and DSPs. The processor 430 is in communication with the ingress ports 410, the receiver units 420, the transmitter units 440, the egress ports 450, and the memory 460. The processor 430 includes a coding module 470. The coding module 470 implements the disclosed embodiments described herein. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 includes one or more disks, tape drives, and solid-state drives and may be used as an over-flow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
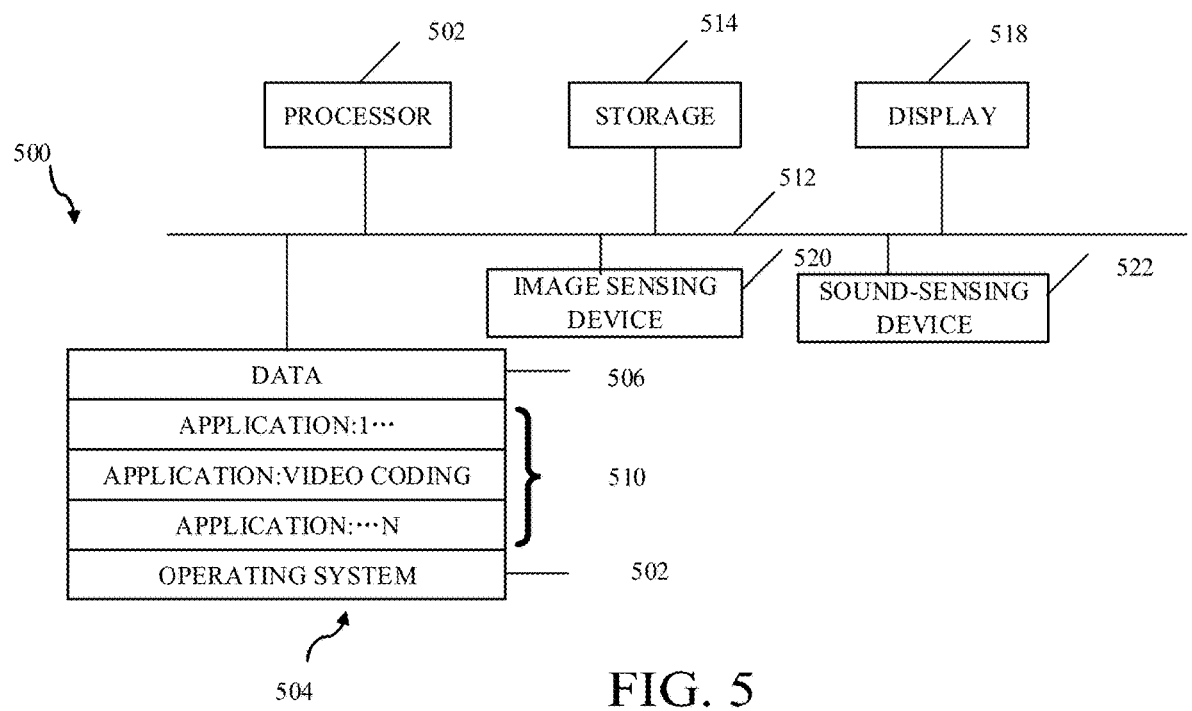
FIG. 5 is a block diagram of a video data coding apparatus in which various embodiments of the present disclosure may be implemented.

FIG. 5 is a simplified block diagram of an apparatus 500 that may be used as either or both of the source device 12 and the destination device 14 from FIG. 1A according to an exemplary embodiment. Apparatus 500 can implement techniques of this present application. Apparatus 500 can be in the form of a computing system including multiple computing devices, or in the form of a single computing device, for example, a mobile phone, a tablet computer, a laptop computer, a notebook computer, a desktop computer, and the like.

Processor 502 of apparatus 500 can be a central processing unit. Alternatively, processor 502 can be any other type of device, or multiple devices, capable of manipulating or processing information now-existing or hereafter developed. Although the disclosed implementations can be practiced with a single processor as shown, e.g., processor 502, advantages in speed and efficiency can be achieved using more than one processor.

Memory 504 in the apparatus 500 can be a read only memory (ROM) device or a random access memory (RAM) device in an implementation. Any other suitable type of storage device can be used as memory 504. Memory 504 may be used to store code and/or data 506 that is accessed by processor 502 using bus 512. Memory 504 can further be used to store operating system 508 and application programs 510. Application programs 510 may include at least one program that permits processor 502 to perform the methods described here. For example, application programs 510 can include multiple applications 1 through N, and further include a video coding application that performs the methods described here. Apparatus 500 can also include additional memory in the form of secondary storage 514, which can, for example, be a memory card used with a mobile computing device. Because the video communication sessions may contain a significant amount of information, they can be stored in whole or in part in storage 514 and loaded into memory 504 as needed for processing.

Apparatus 500 can also include one or more output devices, such as display 518. Display 518 may be, in one example, a touch sensitive display that combines a display with a touch sensitive element operable to sense touch inputs. Display 518 can be coupled to processor 502 via bus 512. Other output devices that permit a user to program or otherwise use apparatus 500 can be provided in addition to or as an alternative to display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

Apparatus 500 can also include or be in communication with image-sensing device 520, for example a camera, or any other image-sensing device 520 now existing or hereafter developed that can sense an image such as the image of a user operating apparatus 500. Image-sensing device 520 can be positioned such that it is directed toward the user operating apparatus 500. In an example, the position and optical axis of the image-sensing device 520 can be configured such that the field of vision includes an area that is directly adjacent to display 518 and from which display 518 is visible.

Apparatus 500 can also include or be in communication with sound-sensing device 522, for example a microphone, or any other sound-sensing device now existing or hereafter developed that can sense sounds near apparatus 500. Sound-sensing device 522 can be positioned such that it is directed toward the user operating apparatus 500 and can be configured to receive sounds, for example, speech or other utterances, made by the user while the user operates apparatus 500.

Although FIG. 5 depicts processor 502 and memory 504 of apparatus 500 as being integrated into a single device, other configurations can be utilized. The operations of processor 502 can be distributed across multiple machines (each machine having one or more of processors) that can be coupled directly or across a local area or other network. Memory 504 can be distributed across multiple machines such as a network-based memory or memory in multiple machines performing the operations of apparatus 500. Although depicted here as a single bus, bus 512 of apparatus 500 may include multiple buses. Further, secondary storage 514 can be directly coupled to the other components of apparatus 500 or can be accessed via a network and can include a single integrated unit such as a memory card or multiple units such as multiple memory cards. Apparatus 500 can thus be implemented in a wide variety of configurations.

The present disclosure is related to intra-prediction as part of a video coding mechanism.

Figure 6:
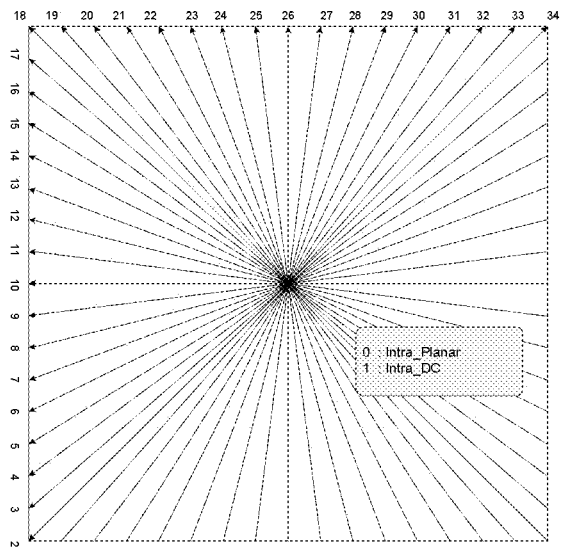
FIG. 6 is an illustration of intra-prediction modes of H.265/HEVC.

Intra prediction can be used when there is no available reference picture, or when inter predication coding is not used for the current block or picture. The reference samples of intra prediction are usually derived from previously coded (or reconstructed) neighboring blocks in the same picture. For example, both in H.264/AVC and H.265/HEVC, the boundary samples of adjacent blocks are used as reference for intra prediction. In order to cover different texture or structural characters, there are many different intra prediction modes. In each mode, a different prediction signal derivation method is used. For example, H.265/HEVC supports a total of 35 intra prediction modes, as shown in FIG. 6.

For intra prediction, the decoded boundary samples of adjacent blocks are used as reference. The encoder selects the best luma intra prediction mode of each block from 35 options, which includes 33 directional prediction modes, a DC mode and a Planar mode. The mapping between the intra prediction direction and the intra prediction mode number is specified in FIG. 6.

Figure 7:
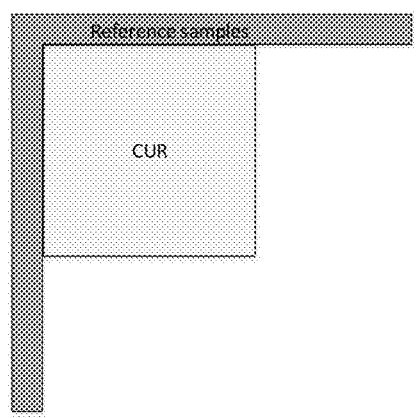
FIG. 7 is an illustration of reference samples.

As shown in FIG. 7, the block "CUR" is a current block to predict, the gray samples along the boundary of adjacent constructed blocks are used as reference samples. The prediction signal can be derived by mapping the reference samples according to a specific method which is indicated by the intra prediction mode.

Video coding may be performed based on color space and color format. For example, color video plays an important role in multimedia systems, where various color spaces are used to efficiently represent color. A color space specifies color with numerical values using multiple components. A popular color space is the RGB color space, where color is represented as a combination of three primary color component values (i.e., red, green and blue).

YCbCr can be easily converted from the RGB color space via a linear transformation and the redundancy between different components, namely the cross component redundancy, is significantly reduced in the YCbCr color space. One advantage of YCbCr is the backward compatibility with black and white TV as Y signal conveys luminance information. In addition, chrominance bandwidth can be reduced by subsampling the Cb and Cr components in 4:2:0 chroma sampling format with significantly less subjective impact than subsampling in the RGB color space. Because of these advantages, YCbCr has been the major color space in video compression. There are also other color spaces, such as YCoCg, used in video compression. In this disclosure, regardless of the actual color space used, the luma (or L or Y) and two chroma (Cb and Cr) are used to represent the three color components in the video compression scheme.

For example, when the chroma format sampling structure is 4:2:0 sampling, each of the two chroma arrays has half the height and half the width of the luma array. The nominal vertical and horizontal relative locations of luma and chroma samples in pictures are shown in FIG. 8.

FIG. 9 (including FIG. 9A and FIG. 9B) is a schematic diagram illustrating an example mechanism of performing a cross-component linear model (CCLM) intra-prediction 900. FIG. 9 illustrates an example of 4:2:0 sampling. FIG. 9 shows an example of the location of the left and above samples and the sample of the current block involved in the CCLM mode. The white squares are samples of the current block, and the shaded circles are reconstructed samples. FIG. 9A illustrates an example of the neighboring reconstructed pixels of a co-located luma block. FIG. 9B illustrates an example of the neighboring reconstructed pixels of a chroma block. If the video format is YUV4:2:0, then there are one 16×16 luma block and two 8×8 chroma blocks.

The CCLM intra-prediction mechanism 900 is a type of cross-component intra-prediction. Hence, the CCLM intra-prediction 900 may be performed by an intra estimation unit 46 of an encoder 20 and/or an intra prediction unit 94 of a decoder 30. The CCLM intra-prediction 900 predicts chroma samples 903 in a chroma block 901. The chroma samples 903 appear at integer positions shown as intersecting lines. The prediction is based in part on neighboring reference samples, which are depicted as black circles. Unlike with intra-prediction modes 500, the chroma samples 903 are not predicted solely based on the neighboring chroma reference samples 905, which are denoted as reconstructed chroma samples (Rec'C). The chroma samples 903 are also predicted based on luma reference samples 913 and neighboring luma reference samples 915. Specifically, a CU contains a luma block 911 and two chroma blocks 901. A model is generated that correlates the chroma samples 903 and the luma reference samples 913 in the same CU. Linear coefficients for the model are determined by comparing the neighboring luma reference samples 915 to the neighboring chroma reference samples 905.

As the luma reference samples 913 are reconstructed, the luma reference samples 913 are denoted as reconstructed luma samples (Rec'L). As the neighboring chroma reference samples 905 are reconstructed, the neighboring chroma reference samples 905 are denoted as reconstructed chroma samples (Rec'C).

As shown, the luma block 911 contains four times the samples as the chroma block 901. Specifically, the chroma block 901 contains N number of samples by N number of samples while the luma block 911 contains 2N number of samples by 2N number of samples. Hence, the luma block 911 is four times the resolution of the chroma block 901. For the prediction to operate on the luma reference samples 913 and the neighboring luma reference samples 915, the luma reference samples 913 and the neighboring luma reference samples 915 are down-sampled to provide an accurate comparison with the neighboring chroma reference samples 905 and the chroma samples 903. Down-sampling is the process of reducing the resolution of a group of sample values. For example, when YUV4:2:0 format is used, the luma samples may be down-sampled by a factor of four (e.g., width by two, and height by two). YUV is a color encoding system that employs a color space in terms of luma components Y and two chrominance components U and V.

To reduce the cross-component redundancy, there is a cross-component linear model (CCLM, also can be called LM mode, CCIP mode) prediction mode, for which, the chroma samples are predicted based on the reconstructed luma samples of the same coding unit (CU) by using a linear model as follows:

$$\text{pred}_C(i,j) = \alpha \cdot \text{rec}_L'(i,j) + \beta \quad (1)$$

where $\text{pred}_C(i,j)$ represents the predicted chroma samples in a CU and $\text{rec}_L(i,j)$ represents the down-sampled reconstructed luma samples of the same CU, and $\alpha$ and $\beta$ are linear model parameters or linear model coefficients.

In one example, the parameters $\alpha$ and $\beta$ are derived by minimizing the regression error between the neighbouring reconstructed luma samples around the current luma block and the neighboring reconstructed chroma samples around the chroma block as follows:

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \quad (2)$$

$$\beta = \frac{\Sigma C(n) - \alpha \cdot \Sigma L(n)}{N} \quad (3)$$

where L(n) represents the down-sampled top and left neighboring reconstructed luma samples, C(n) represents the top and left neighboring reconstructed chroma samples, and value of N is equal to the sum of the width and height of the current chroma coding block (e.g., chroma block 901). In another example, $\alpha$ and $\beta$ are determined based on the minimum and maximum value of the down-sampled neighboring luma reference samples as discussed with respect to FIG. 16 below.

The present disclosure is related to using luma samples to predict chroma samples via intra-prediction as part of a video coding mechanism. The cross-component linear model (CCLM) prediction modes are added as additional chroma intra prediction modes. At the encoder side, more rate distortion cost check for the chroma component is added for selecting the chroma intra prediction mode.

In general, when CCLM prediction mode (short for LM prediction mode) is applied, video encoder 20 and video decoder 30 may invoke the following steps. Video encoder 20 and video decoder 30 may down-sample the neighboring luma samples. Video encoder 20 and video decoder 30 may derive linear parameters (i.e., $\alpha$ and $\beta$) (also referred to as scaling parameters or parameters of a cross-component linear model (CCLM) prediction mode). Video encoder 20 and video decoder 30 may down-sample the current luma block and derive the prediction (e.g., a predictive block) based on the down-sampled luma block and the linear parameters.

There may be various ways in which to down-sample.

Figure 10:
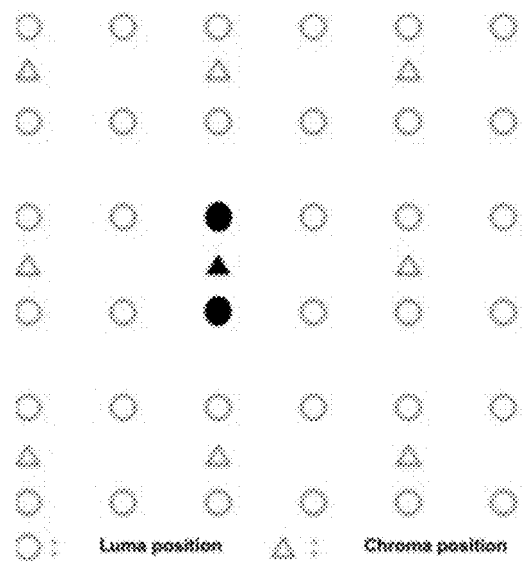
FIG. 10 is a conceptual diagram illustrating an example of luma positions and chroma positions for down-sampling samples of a luma block for generating a predictive block.

FIG. 10 is a conceptual diagram illustrating an example of luma positions and chroma positions for down-sampling samples of a luma block for generating a predictive block for a chroma block. As depicted in FIG. 10, a chroma sample, represented by the filled-in (i.e., solid black) triangle, is predicted from two luma samples, represented by the two filled-in circles, by applying a [1, 1] filter. The [1, 1] filter is one example of a 2-tap filter.

Figure 11:
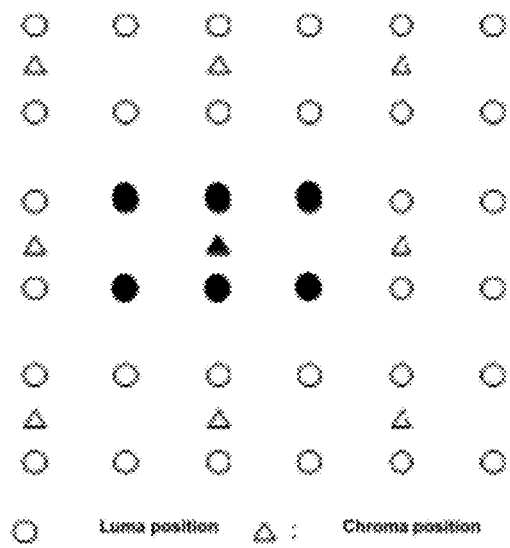
FIG. 11 is a conceptual diagram illustrating another example of luma positions and chroma positions for down-sampling samples of a luma block for generating a predictive block.

FIG. 11 is a conceptual diagram illustrating another example of luma positions and chroma positions for down-sampling samples of a luma block for generating a predictive block. As depicted in FIG. 11, a chroma sample, represented by the filled in (i.e., solid black) triangle, is predicted from six luma samples, represented by the six filled in circles, by applying a 6-tap filter.

FIGS. 12-15 are schematic diagrams illustrating example mechanisms 1200, 1300, 1400, and 1500 of down-sampling to support cross-component intra-prediction, for example according to CCLM intra-prediction 900, mechanism 1600, MDLM intra-prediction using CCIP_A mode 1700 and CCIP_L mode 1800, and/or MMLM intra-prediction as depicted in graph 1900. Hence, mechanisms 1200, 1300, 1400 and 1500 can be may be performed by an intra prediction unit 46 and/or an intra prediction unit 74 of a codec system 10 or 40, an intra prediction unit 46 of an encoder 20, and/or an intra prediction unit 74 of a decoder 30. Specifically, mechanisms 1200, 1300, 1400, and 1500 can be employed during step 2210 of method 220, during step 2320 of method 230 or step 2520 of method 250 at a decoder, and during step 2420 of method 240 or step 2620 of method 260 at an encoder, respectively. The details of FIGS. 12-15 are introduced in International Application No. PCT/US2019/041526, filed on Jul. 12, 2019, which is incorporated herein by reference.

Figure 12:
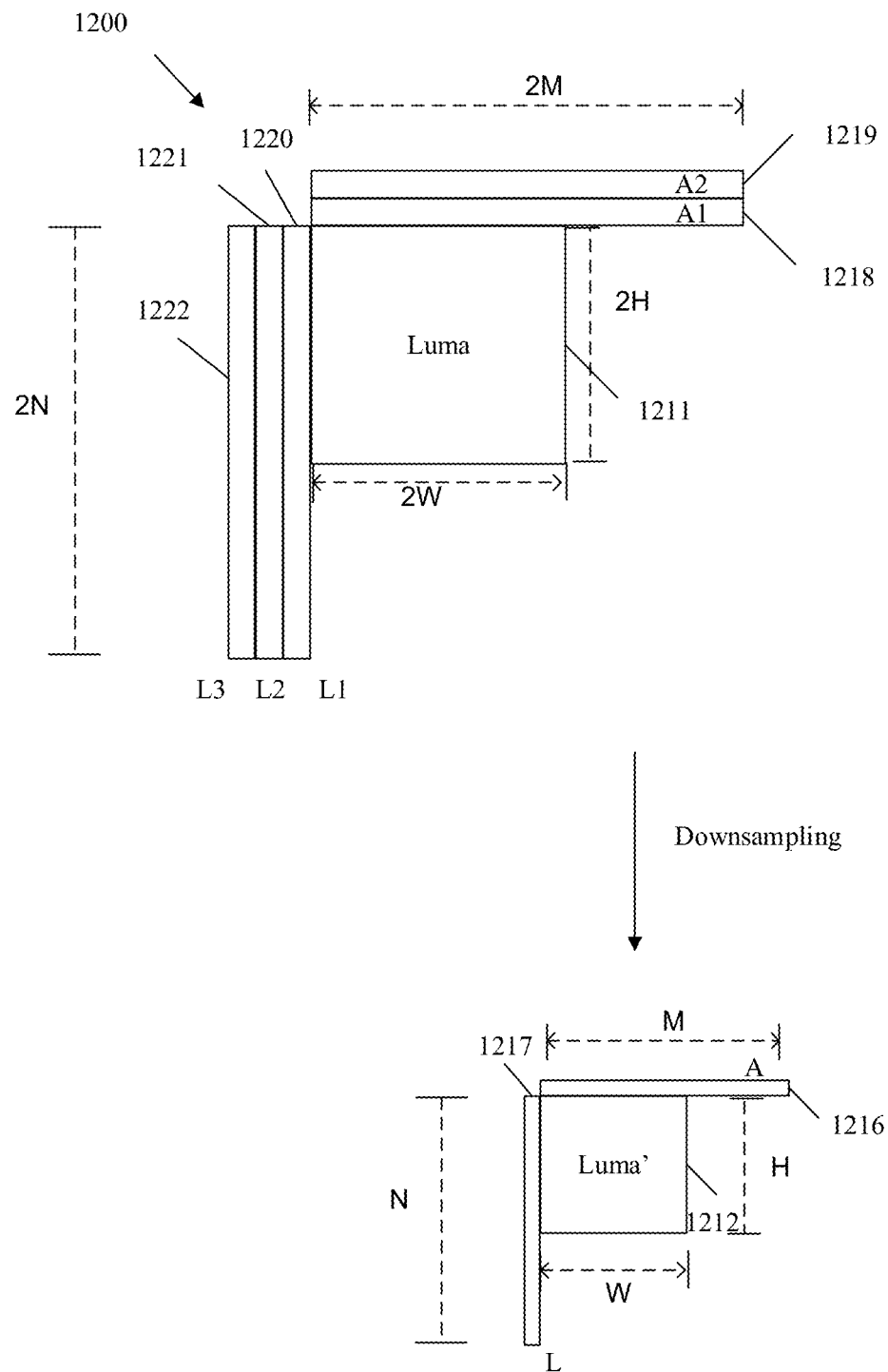
FIGS. 12-15 are schematic diagrams illustrating example mechanisms of down-sampling to support cross-component intra-prediction.

In Mechanism 1200 of FIG. 12, two rows 1218 and 1219 of neighboring luma reference samples are down-sampled and three columns 1220, 1221, and 1222 of neighboring luma reference samples are down-sampled. The rows 1218 and 1219 and columns 1220, 1221, and 1222 are directly adjacent to a luma block 1211 that shares a CU with a chroma block being predicted according to cross-component intra-prediction. After down-sampling, the rows 1218 and 1219 of neighboring luma reference samples become a single row 1216 of down-sampled neighboring luma reference samples. Further, the columns 1220, 1221, and 1222 of neighboring luma reference samples are down-sampled resulting in a single column 1217 of down-sampled neighboring luma reference samples. In addition, the luma samples of the luma block 1211 are down-sampled to create down-sampled luma reference samples 1212. The down-sampled luma reference samples 1212 and the down-sampled neighboring luma reference samples from the row 1216 and the column 1217 can then be employed for cross-component intra-prediction according to equation (1). It should be noted that the dimensions of rows 1218 and 1219 and columns 1220, 1221, and 1222 may extend beyond the luma block 1211 as shown in FIG. 12. For example, the number of top neighboring luma reference samples in each row 1218/1219, which may be denoted as M, is larger than the number of luma samples in a row of the luma block 1211, which may be denoted as W. Further, the number of left neighboring luma reference samples in each column 1220/1221/1222, which may be denoted as N, is larger than the number of luma samples in a column of the luma block 1211, which may be denoted as H.

In an example, mechanism 1200 may be implemented as follows. For a luma block 1211, the two top neighboring rows 1218 and 1219, denoted as A1 and A2, are used for down-sampling to get down-sampled neighboring row 1216 denoted as A. A[i] is the $i^{th}$ sample in A, A1[i] is the $i^{th}$ sample in A1, and A2[i] is the $i^{th}$ sample in A2. In a specific example, a six tap down-sampling filter can be applied to neighboring rows 1218 and 1219 to obtain the down-sampled neighboring row 1216 according to equation (4):

$$A[i]=(A2[2i]*2+A2[2i-1]+A2[2i+1]+A1[2i]*2+A1[2i-1]+A1[2i+1]+4)>>3 \quad (4)$$

Further, the left neighboring columns 1220, 1221, and 1222 are denoted as L1, L2, and L3 and are used for down-sampling to obtain a down-sampled neighboring column 1217 denoted as L. L[i] is the $i^{th}$ sample in L, L1[i] is the $i^{th}$ sample in L1, L2[i] is the $i^{th}$ sample in L2, and L3[i] is the $i^{th}$ sample in L3. In an specific example, a six tap down-sampling filter can be applied to neighboring columns 1220, 1221, and 1222 to obtain down-sampled neighboring column 1217 according to equation (5):

$$L[i]=(L2[2i]*2+L1[2i]+L3[2i]+L2[2i+1]*2+L1[2i+1]+L3[2i+1]+4)>>3 \quad (5)$$

Figure 13:
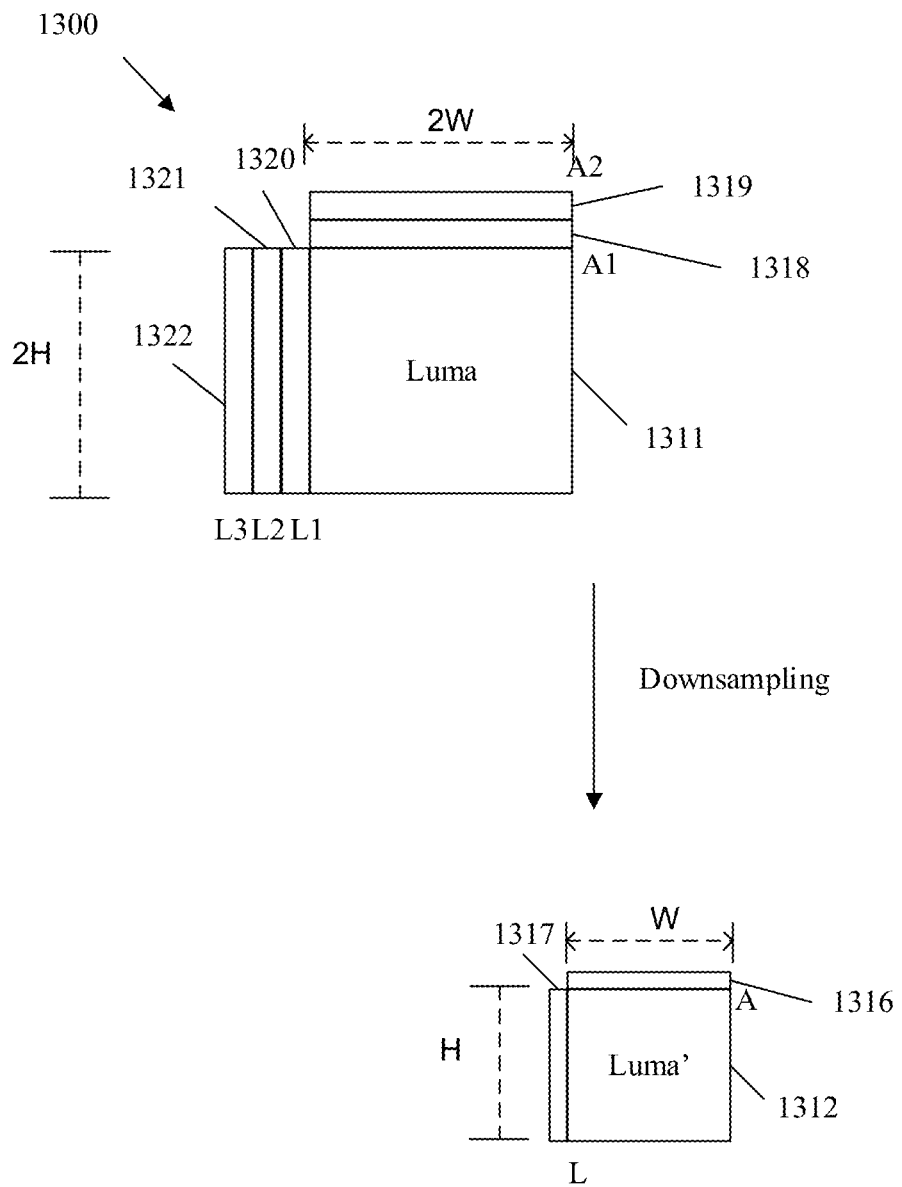

Mechanism 1300 of FIG. 13 is substantially similar to mechanism 1200 of FIG. 12. Mechanism 1300 includes a luma block 1311 with neighboring rows 1318 and 1319 and columns 1320, 1321, and 1322 of neighboring luma reference samples, which are similar to luma block 1211, rows 1218 and 1219, and columns 1220, 1221, and 1222, respectively. The difference is that rows 1318 and 1319 and columns 1320, 1321, and 1322 do not extend past the luma block 1211. As in mechanism 1200, the luma block 1311, rows 1318 and 1319 and columns 1320, 1321, and 1322 are down-sampled to create down-sampled luma reference samples 1312, column 1317, and row 1316 containing down-sampled neighboring luma reference samples. Column 1317 and row 1316 do not extend beyond the block of down-sampled luma reference samples 1312. Otherwise, down-sampled luma reference samples 1312, column 1317, and row 1316 are substantially similar to down-sampled luma reference samples 1212, column 1217, and row 1216, respectively.

Figure 14:
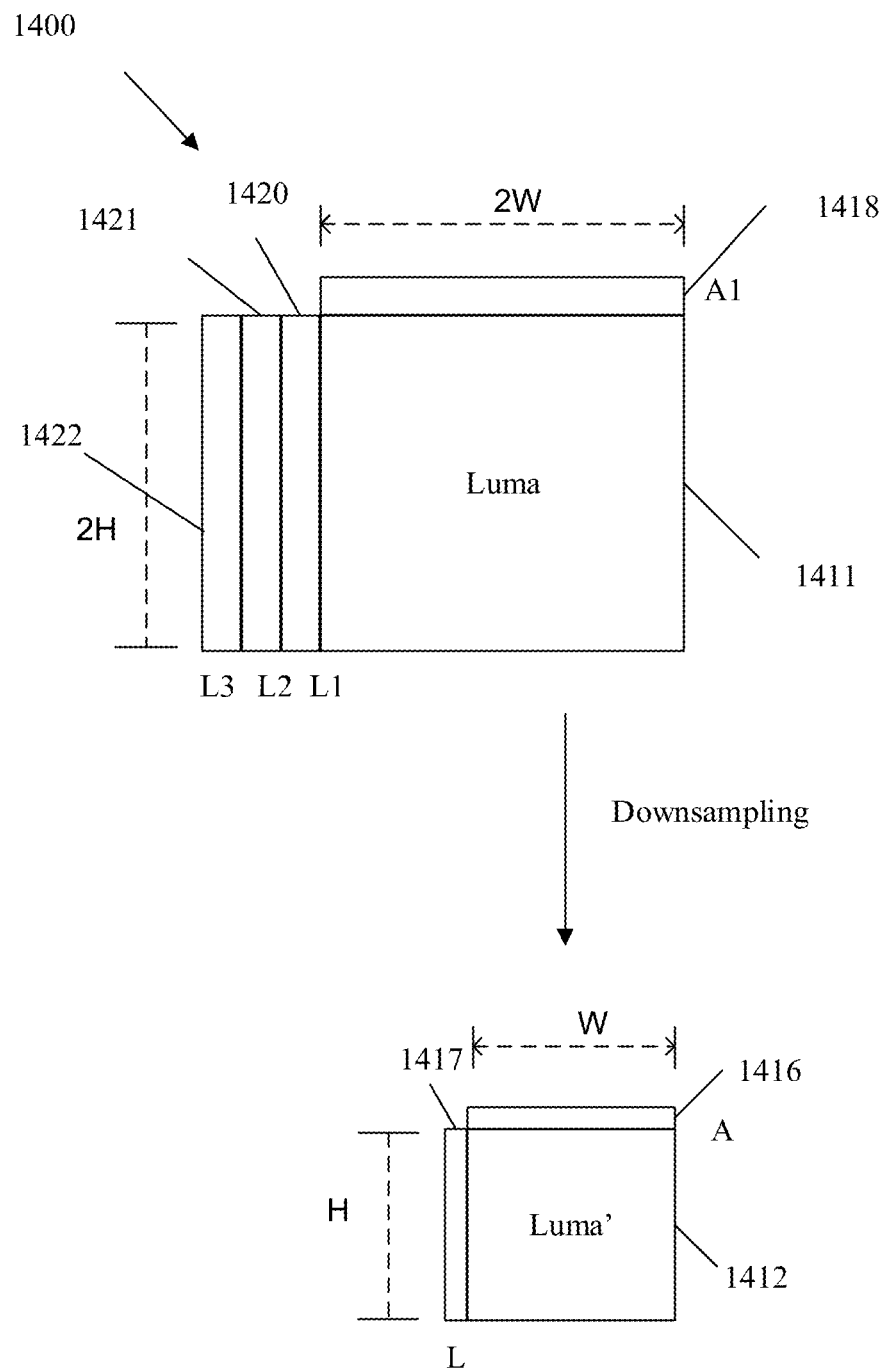

Mechanism 1400 of FIG. 14 is similar to mechanisms 1200 and 1300 but employs a single row 1418 of neighboring luma reference samples instead of two rows. Mechanism 1400 also employs three columns 1420, 1421, and 1422 of neighboring luma reference samples. The row 1418 and columns 1420, 1421, and 1422 are directly adjacent to a luma block 1411 that shares a CU with a chroma block being predicted according to cross-component intra-prediction. After down-sampling, the row 1418 of neighboring luma reference samples becomes a row 1416 of down-sampled neighboring luma reference samples. Further, the columns 1420, 1421, and 1422 of neighboring luma reference samples are down-sampled resulting in a single column 1417 of down-sampled neighboring luma reference samples. Further, the luma samples of the luma block 1411 are down-sampled to create down-sampled luma reference samples 1412. The down-sampled luma reference samples 1412 and the down-sampled neighboring luma reference samples from the row 1416 and the column 1417 can then be employed for cross-component intra-prediction according to equation (1).

During down-sampling, the rows and columns are stored in memory in a line buffer. By omitting row 1319 during down-sampling and instead using a single row 1418 of values significantly decreases memory usage in the line buffer. However, the down-sampled neighboring luma reference samples from the row 1316 have been found to be substantially similar to the down-sampled neighboring luma reference samples from the row 1416. As such, omitting row 1319 during down-sampling and instead using a single row 1418 results in reduced memory utilization in the line buffer, and hence better processing speed, greater parallelism, fewer memory requirements, etc., without sacrificing accuracy and hence coding efficiency. Accordingly, in one example embodiment, a single row 1418 of neighboring luma reference samples are down-sampled for use in cross-component intra-prediction.

In an example, mechanism 1400 may be implemented as follows. For a luma block 1411, the top neighboring row 1418, denoted as A1, is used for down-sampling to get down-sampled neighboring row 1416 denoted as A. A[i] is the $i^{th}$ sample in A and A1[i] is the $i^{th}$ sample in A1. In an specific example, a three tap down-sampling filter can be applied to neighboring row 1418 to obtain the down-sampled neighboring row 1416 according to equation (6):

$$A[i]=(A1[2i]*2+A1[2i-1]+A1[2i+1]+2)>>2 \qquad (6)$$

Further, the left neighboring columns 1420, 1421, and 1422 are denoted as L1, L2, and L3 and are used for down-sampling to obtain a down-sampled neighboring column 1417 denoted as L. L[i] is the $i^{th}$ sample in L, L1[i] is the $i^{th}$ sample in L1, L2[i] is the $i^{th}$ sample in L2, and L3[i] is the $i^{th}$ sample in L3. In a specific example, a six tap down-sampling filter can be applied to neighboring columns 1320, 1321, and 1322 to obtain down-sampled neighboring column 1317 according to equation (7):

$$L[i]=(L2[2i]*2+L1[2i]+L3[2i]+L2[2i+1]*2+L1[2i+1]+L0[2i+1]+4)>>3 \qquad (7)$$

It should be noted that the mechanism 1400 is not limited to the down-sampling filters described. For example, instead of employing a three tap down-sampling filter as described in equation (6), the samples can also be fetched directly as in equation (8) below:

$$A[i]=A1[2i] \qquad (8)$$

Figure 15:
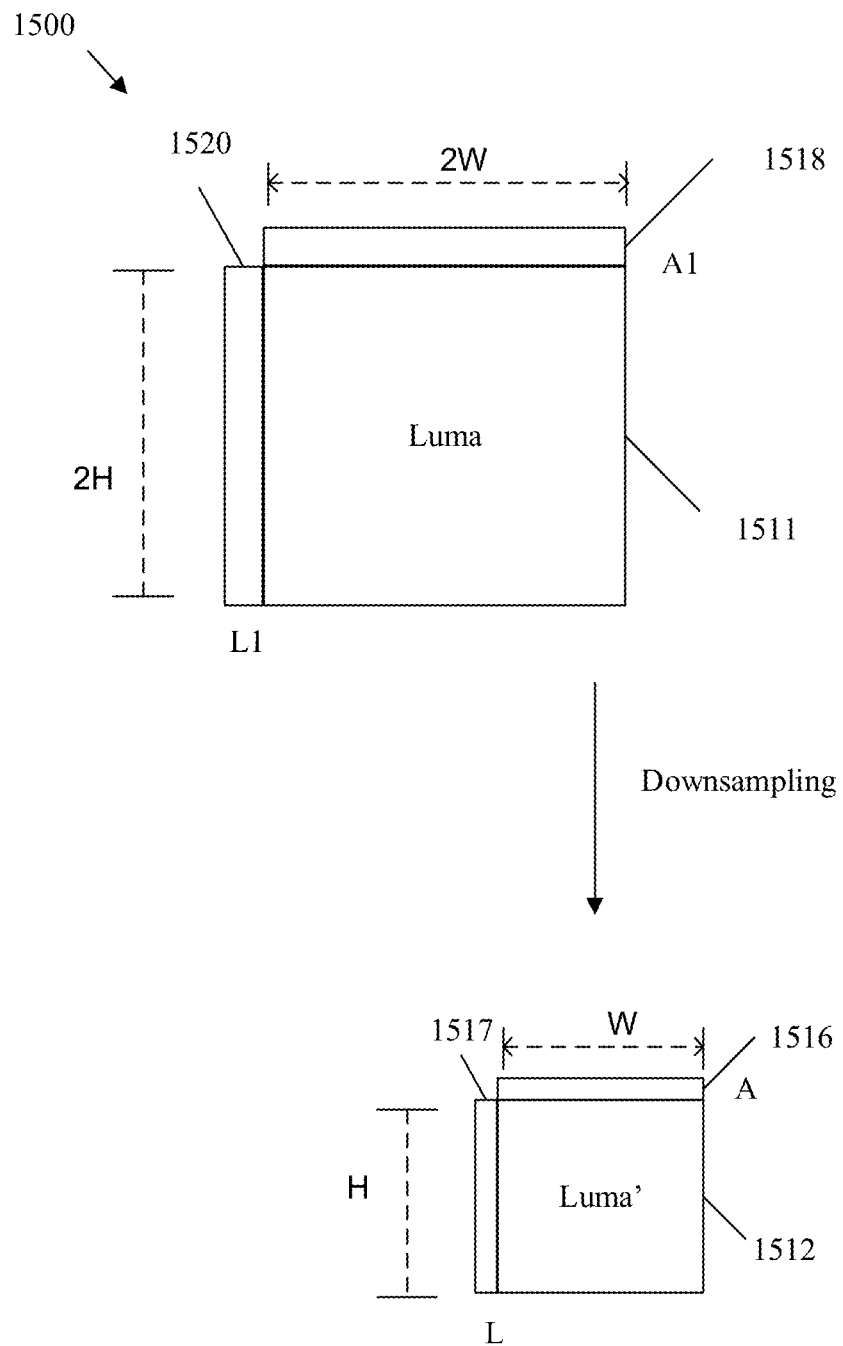

Mechanism 1500 of FIG. 15 is similar to mechanism 1300 but employs a single row 1518 of neighboring luma reference samples and a single column 1520 of neighboring luma reference samples instead of two rows 1318 and 1319 and three columns 1320, 1321, and 1322, respectively. The row 1518 and column 1520 are directly adjacent to a luma block 1511 that shares a CU with a chroma block being predicted according to cross-component intra-prediction. After down-sampling, the row 1518 of neighboring luma reference samples becomes a row 1516 of down-sampled neighboring luma reference samples. Further, the column 1520 of neighboring luma reference samples are down-sampled resulting in a single column 1517 of down-sampled neighboring luma reference samples. The down-sampled neighboring luma reference samples from the row 1516 and the column 1517 can then be employed for cross-component intra-prediction according to equation (1).

Mechanism 1500 omits row 1319 and columns 1321 and 1322 during down-sampling and instead using a single row 1518 and single column 1520 of values, which significantly decreases memory usage in the line buffer. However, the down-sampled neighboring luma reference samples from the row 1316 and column 1317 have been found to be substantially similar to the down-sampled neighboring luma reference samples from the row 1516 and column 1517, respectively. As such, omitting row 1319 and columns 1321 and 1322 during down-sampling and instead using a single row 1518 and column 1520 results in reduced memory utilization in the line buffer, and hence better processing speed, greater parallelism, fewer memory requirements, etc., without sacrificing accuracy and hence coding efficiency. Accordingly, in another example embodiment, a single row 1518 of neighboring luma reference samples and a single column 1520 of neighboring luma reference samples are down-sampled for use in cross-component intra-prediction.

In an example, mechanism 1500 may be implemented as follows. For a luma block 1511, the top neighboring row 1518, denoted as A1, is used for down-sampling to get down-sampled neighboring row 1516 denoted as A. A[i] is the $i^{th}$ sample in A and A1[i] is the $i^{th}$ sample in A1. In a specific example, a three tap down-sampling filter can be applied to neighboring row 1518 to obtain the down-sampled neighboring row 1516 according to equation (9):

$$A[i]=(A1[2i]*2+A1[2i-1]+A1[2i+1]+2)>>2 \qquad (9)$$

Further, the left neighboring column 1520 is denoted as L1 is used for down-sampling to obtain a down-sampled neighboring column 1517 denoted as L. L[i] is the $i^{th}$ sample in L and L1[i] is the $i^{th}$ sample in L1. In a specific example, a two tap down-sampling filter can be applied to neighboring column 1520 to obtain down-sampled neighboring column 1517 according to equation (10):

$$L[i]=(L1[2i]+L1[2i+1]+1)>>2 \qquad (10)$$

In an alternate example, mechanism 1500 could be modified to employ an L2 column (e.g., column 1321) instead of an L1 column (e.g., column 1520) when down-sampling. In such a case, a two tap down-sampling filter can be applied to neighboring column L2 to obtain down-sampled neighboring column 1517 according to equation (11). It should be noted that the mechanism 1500 is not limited to the down-sampling filters described. For example, instead of employing a two tap and a three tap down-sampling filter as described in equations (9) and (10), the samples can also be fetched directly as in equations (11) and (12) below.

$$A[i]=A1[2i] \qquad (11)$$

$$L[i]=L2[2i] \qquad (12)$$

Further, it should also be noted that mechanisms 1400 and 1500 can also be applied when the dimensions of rows 1418, 1416, 1518, 1516 and/or columns 1420, 1421, 1422, 1417, 1520, and/or 1517 extend beyond the corresponding luma block 1411 and/or 1511 (e.g., as shown in FIG. 12).

In the Joint exploration model (JEM), there are two CCLM modes: the single model CCLM mode and the multiple model CCLM mode (MMLM). As indicated by the name, the single model CCLM mode employs one linear model for predicting the chroma samples from the luma samples for the whole CU, while in MMLM, there can be two linear models. In MMLM, neighboring luma samples and neighboring chroma samples of the current block are classified into two groups, each group is used as a training set to derive a linear model (i.e., a particular α and a particular β are derived for a particular group). Furthermore, the samples of the current luma block are also classified based on the same rule for the classification of neighboring luma samples.

Figure 16:
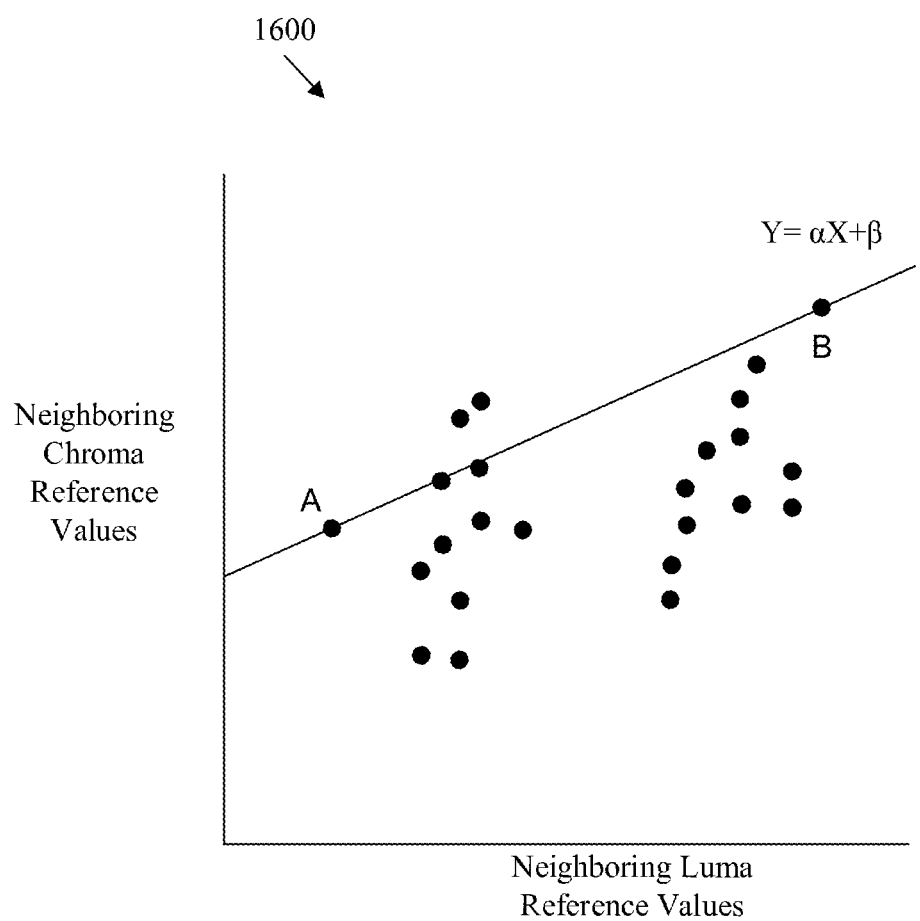
FIG. 16 is an illustration of the straight line between minimum and maximum luma values.

FIG. 16 is a graph illustrating an example mechanism 1600 of determining linear model parameters to support CCLM intra-prediction. To derive the linear model parameters α and β, the top and left neighboring reconstructed luma samples may be down-sampled to obtain a one-to-one relationship with the top and left neighboring reconstructed chroma samples. In mechanism 1200, α and β, as used in equation (1), are determined based on the minimum and maximum value of the down-sampled neighboring luma reference samples. The two points (2 pairs of luma value and chroma value or 2 couples of luma value and chroma value)

(A, B) are the minimum and maximum values inside the set of neighboring luma samples as depicted in FIG. 16. This is an alternate approach to determining α and β based on minimizing the regression error.

As shown in FIG. 16, a straight line is presented by the equation Y=αx+β, where the linear model parameters α and β are obtained according to the following equations (13) and (14):

$$\alpha = \frac{y_B - y_A}{x_B - x_A} \quad (13)$$

$$\beta = y_A - \alpha x_A \quad (14)$$

where $(x_A, y_A)$ is a set of coordinates defined by the minimum neighboring luma reference value and a corresponding chroma reference value, and $(x_B, y_B)$ is a set of coordinates defined by the maximum neighboring luma reference value and a corresponding chroma reference value. Here note that the two points (2 pairs of luma value and chroma value) (A, B) are chosen from the down-sampled luma reconstructed neighboring samples and the chroma reconstructed neighboring samples.

The example mechanism 1600 uses the max/min luma values and the corresponding chroma values to derive the linear model parameters. Only 2 points (a point is represented by a pair of luma value and chroma value) are chosen from the neighboring luma samples and the neighboring chroma samples, to derive the linear model parameters. The example mechanism 1600 is not applied for some video sequences with some noise.

Multi-Directional Linear Model

Besides both the above (or top) neighboring samples and left neighboring samples can be used to calculate the linear model parameters together, they also can be used alternatively in the other 2 CCIP (cross-component intra prediction) modes, called CCIP_A, and CCIP_L modes. CCIP_A and CCIP_L also can be denoted as multi-directional linear model (MDLM) for brevity.

Figure 17:
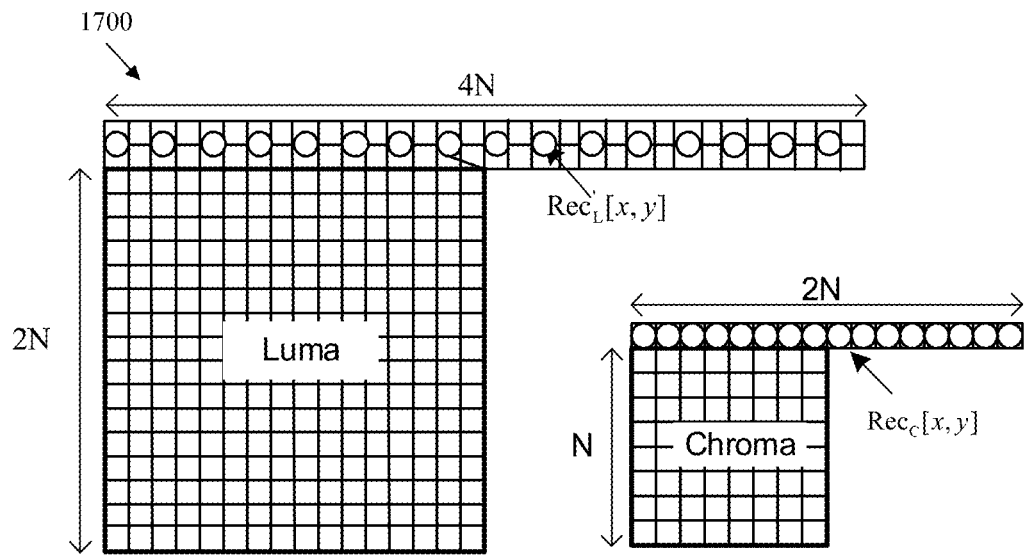
FIG. 17 is an illustration of cross-component intra prediction_A (CCIP_A) mode.
Figure 18:
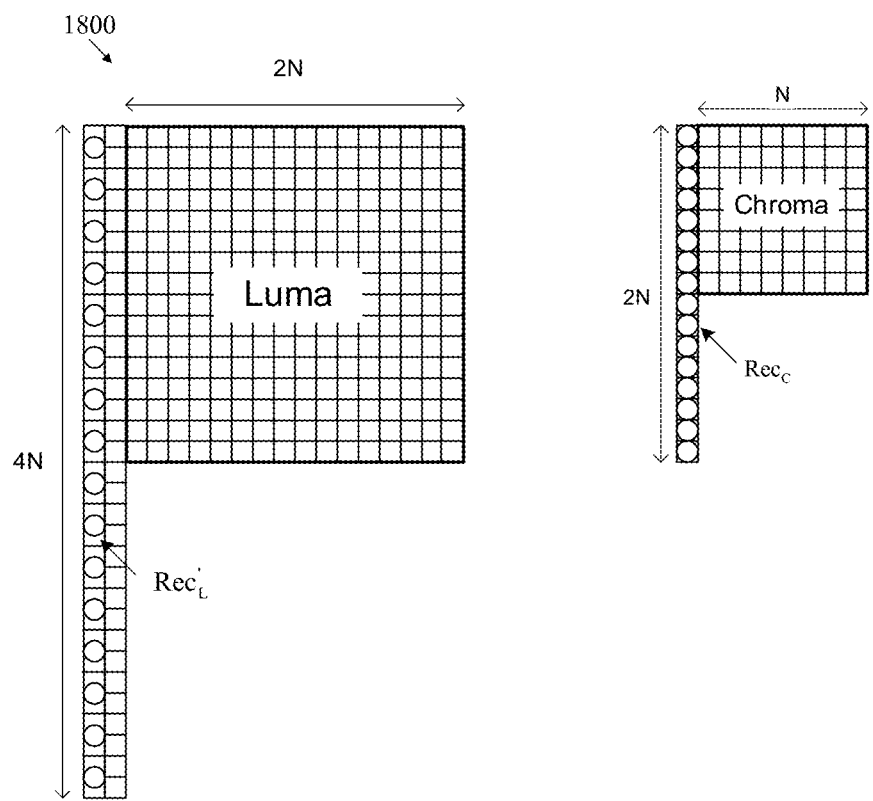
FIG. 18 is an illustration of cross-component intra prediction_L (CCIP_L) mode.

FIGS. 17 and 18 are schematic diagrams illustrating an example mechanism of performing MDLM intra-prediction. MDLM intra-prediction operates in a manner similar to CCLM intra-prediction 900. Specifically, MDLM intra-prediction uses both a cross-component linear model prediction (CCIP)_A mode 1700 and a CCIP_L mode 1800 when determining linear model parameters α and β. For example, MDLM intra-prediction may calculate linear model parameters α and β using CCIP_A mode 1700 and CCIP_L mode 1800. In another example, MDLM intra-prediction may use CCIP_A mode 1700 or CCIP_L mode 1800 to determine linear model parameters α and β.

In CCIP_A mode, only the top neighboring samples are used to calculate the linear model parameters. To obtain more reference samples, the top neighboring samples are extended to (W+H), usually. As shown in FIG. 17, W=H, where W indicates the width of the respective luma or chroma block, and H indicates the height of the respective luma or chroma block.

In CCIP_L mode, only left neighboring samples are used to calculate the linear model parameters. To obtain more reference samples, the left neighboring samples are extended to (H+W), usually. As shown in FIG. 18, W=H, where W indicates the width of the respective luma or chroma block, and H indicates the height of the respective luma or chroma block.

CCIP mode (i.e. CCLM or LM mode) and MDLM (CCIP_A and CCIP_L) can be used together, or, alternatively. e.g., only CCIP is used in a codec, or only MDLM is used in a codec, or both CCIP and MDLM are used in a codec.

Multiple Model CCLM

Besides the single model CCLM, there is another mode called the multiple model CCLM mode (MMLM). As indicated by the name, the single model CCLM mode employs one linear model for predicting the chroma samples from the luma samples for the whole CU, while in MMLM, there can be two models. In MMLM, neighboring luma samples and neighboring chroma samples of the current block are classified into two groups, each group is used as a training set to derive a linear model (i.e., a particular α and β are derived for a particular group). Furthermore, the samples of the current luma block are also classified based on the same rule for the classification of neighboring luma samples.

Figure 19:
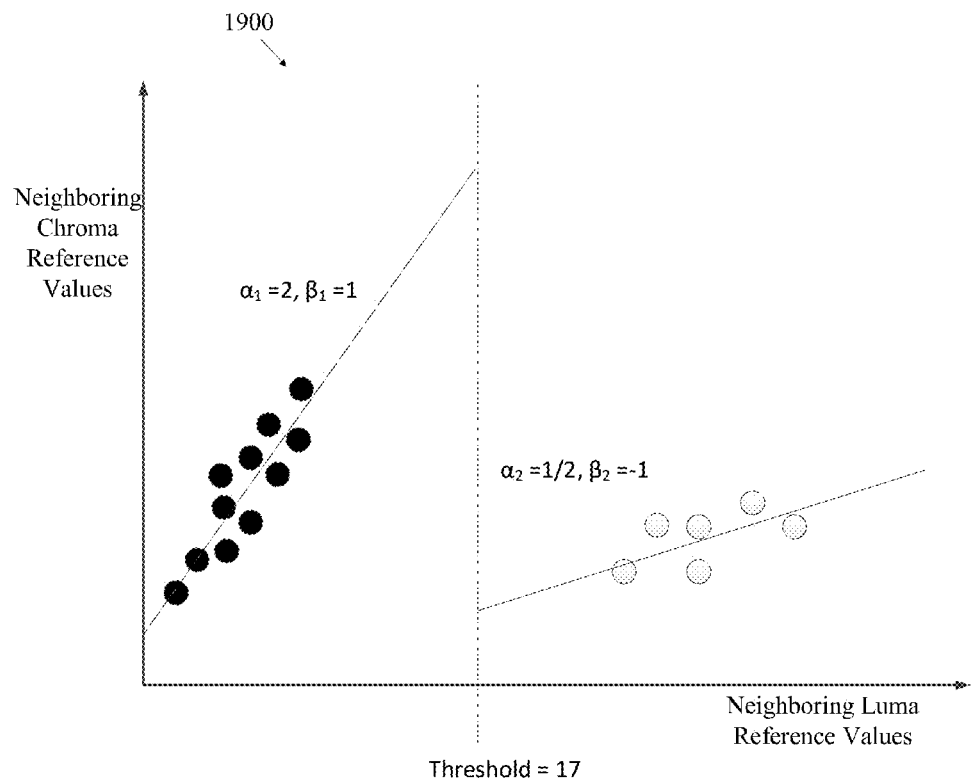
FIG. 19 is a graph illustrating an example mechanism of determining linear model parameters to support multiple model CCLM (MMLM) intra-prediction.

FIG. 19 is a graph illustrating an example mechanism 1900 of determining linear model parameters to support MMLM intra-prediction. MMLM intra-prediction, as shown in graph 1900 is a type of cross-component intra-prediction. MMLM intra-prediction is similar to CCLM intra-prediction. The difference is that in MMLM, the neighboring reconstructed luma samples are placed into two groups by comparing the relevant luma value (e.g., Rec'L) to a threshold. CCLM intra-prediction is then performed on each group to determine linear model parameters α and β and complete a corresponding linear model according to equation (1). The classification of the neighboring reconstructed luma samples into two groups may be performed according to equation (15) below:

In an example, the threshold is calculated as the average value of the neighboring reconstructed luma samples. A neighboring reconstructed luma sample with $Rec'_L[x,y]$ <=Threshold is classified into group 1; while a neighboring reconstructed luma sample with $Rec'_L[x,y]$>Threshold is classified into group 2.

$$\begin{cases} Pred_C[x, y] = \alpha_1 \times Rec'_L[x, y] + \beta_1 & \text{if } Rec'_L[x, y] \leq \text{Threshold} \\ Pred_C[x, y] = \alpha_2 \times Rec'_L[x, y] + \beta_2 & \text{if } Rec'_L[x, y] > \text{Threshold} \end{cases} \quad (15)$$

where the variables of equation (15) is defined similarly to equation (1) with a subscript of one indicating relation to a first group and a subscript of two indicating a relationship to a second group.

As shown by graph 1900, linear model parameters $\alpha_1$ and $\beta_1$ can be calculated for a first group and linear model parameters $\alpha_2$ and $\beta_2$ can be calculated for a second group. As a specific example, such values may be $\alpha_1=2$ of two, $\beta_1=1$, $\alpha_2=\frac{1}{2}$, and $\beta_2=-1$ of negative one where the threshold is a luma value of 17. The MMLM intra-prediction can then select the resulting model that provides the least residual samples and/or results in the greatest coding efficiency.

As noted above, the example mechanisms of performing different CCLM intra-prediction discussed herein use max/min luma values and the corresponding chroma values to derive the linear model parameters, improved mechanisms of performing CCLM intra-prediction that achieve robust linear model parameters are desirable.

If more than one points have maximum value or more than one points have minimum value, then the pair of points will be chosen based on the chroma value of the corresponding points.

If more than one points have maximum value or more than one points have minimum value, the mean chroma value of the luma samples with the maximum value will be set as the corresponding chroma value for maximum luma value, and the mean chroma value of the luma samples with the minimum value will be set as the corresponding chroma value for minimum luma value;

Not only 1 pair of points (minimum and maximum) will be chosen. Specifically, the N points which has larger luma value, and the M points which has smaller luma value will be used to calculate the linear model parameter.

Not only 1 pair of points will be chosen. Specifically, the N points with luma value within a range of [MaxValue−$T_1$, MaxValue], and the M points with luma value within a range of [MinValue, MinValue+$T_2$] will be chosen as the points to calculate the linear model parameter.

Not only the above and left neighboring samples are used to obtain the max/min values, but also some extended neighboring samples are used, like the below left neighboring samples and top right neighboring samples.

With the example improved mechanisms mentioned above, more robust linear model parameters can be arrived with improving the coding efficiency of CCLM intra-prediction.

In the present disclosure, the improved mechanisms for obtaining the max/min luma values and the corresponding chroma values among the couples of luma and chroma samples will be described in details below.

Here note that, the improved mechanisms also can be used in MDLM and MMLM.

In the present disclosure, the improved mechanisms are presented to obtain the maximum and minimum luma values and the corresponding chroma values to derive the linear model parameters. By the improved mechanisms, more robust linear model parameters can be derived.

In an example, here the set of the pairs of luma samples and chroma samples are illustrated as $\{(p_0, q_0), (p_1, q_1), (p_2, q_2), \ldots, (p_1, q_1), \ldots, (p_{V-1}, q_{V-1})\}$. Where $p_i$ is the luma value of the $i^{th}$ point, $q_i$ is the chroma value of the $i^{th}$ point. Here the set of luma points is noted as $P=\{p_0, p_1, p_2, \ldots, p_1, \ldots, p_{V-1}\}$, the set of the chroma points is noted as $Q=\{q_0, q_1, \ldots, q_i, \ldots, q_{V-1}\}$.

First Improved Mechanism: More than 1 Extreme Points, and the Couple of Points is Chosen According to Chroma Value In the first improved mechanism, if more than 1 points have the max/min value, then the couple of points will be chosen based on the chroma value of the corresponding points. The couple of points which have the smallest chroma value difference will be chosen as the couple of points to derive the linear model parameter.

For example, suppose that the $5^{th}$, $7^{th}$, $8^{th}$ points have the maximum luma value, and the $4^{th}$, $6^{th}$ points have the minimum luma value, $|q_7-q_4|$ is the smallest value among $|q_5-q_4|$, $|q_5-q_6|$, $|q_7-q_4|$, $|q_7-q_6|$, $|q_8-q_4|$ and $|q_8-q_6|$. Then the $7^{th}$ and the $4^{th}$ points will be chosen to derive the linear model parameters.

Here note that, besides using the smallest chroma value difference, the first improved mechanism can also use the biggest chroma value difference. For example, suppose that the $5^{th}$, $7^{th}$, $8^{th}$ points have the maximum luma value, and the $4^{th}$, $6^{th}$ points have the minimum luma value, $|q_5-q_6|$ is the biggest value among $|q_5-q_4|$, $|q_5-q_6|$, $|q_7-q_4|$, $|q_7-q_6|$, $|q_8-q_4|$ and $|q_8-q_6|$. Then the $5^{th}$ and the $6^{th}$ points will be chosen to derive the linear model parameters.

Here note that, the improved mechanism also can be used in MDLM, and MMLM.

Second Improved Mechanism: More than 1 Extreme Points, Using the Mean Chroma Value In the second improved mechanism, if more than one points have the max/min value, then the mean chroma value will be used. The chroma value corresponding to the maximum luma value is the mean chroma value of the points with maximum luma value. The chroma value corresponding to the minimum luma value is the mean chroma value of the points with minimum luma value.

For example, if the $5^{th}$, $7^{th}$, $8^{th}$ points have the maximum luma value, and the $4^{th}$, $6^{th}$ points have the minimum luma value. Then the chroma value corresponding to the maximum luma value is the mean value of $q_5$, $q_7$ and $q_8$. The chroma value corresponding to the minimum luma value is the mean value of $q_4$ and $q_6$.

Here note that, the improved mechanism also can be used in MDLM, and MMLM.

Third Improved Mechanism: (More than One Points Based on Number of Points), More than 1 Bigger/Smaller Points Will be Used, Using Mean Value In the third improved mechanism, N points will be used to calculate the maximum luma value and the corresponding chroma value. The selected N points have bigger luma value than other points. The mean luma value of the selected N points will be used as the maximum luma value, and the mean chroma value of the selected N points will be used as the chroma value corresponding to the maximum luma value.

M points will be used to calculate the minimum luma value and the corresponding chroma value. The selected M points have smaller luma value than other points. The mean luma value of the selected M points will be used as the minimum luma value, and the mean chroma value of the selected M points will be used as the chroma value corresponding to the minimum luma value.

For example, if the $5^{th}$, $7^{th}$, $8^{th}$, $9^{th}$, $11^{th}$ points have bigger luma value than other points, and the $4^{th}$, $6^{th}$, $14^{th}$, $18^{th}$ points have the smaller luma value. Then the mean value of $p_5$, $p_7$, $p_8$, $p_9$ and $p_{11}$ is the maximum luma value used for linear model parameters, and mean value of the $q_5$, $q_7$, $q_8$, $q_9$ and $q_{11}$ is the chroma value corresponding to maximum luma value. Then the mean value of $p_4$, $p_6$, $p_{14}$ and $p_{18}$ is the minimum luma value used for linear model parameter, and the mean value of $q_4$, $q_6$, $q_{14}$ and $q_{18}$ is the chroma value corresponding to minimum luma value.

Here note that, M and N can be equal, or not equal. For example, M=N=2.

Here not that, M and N can be adaptively defined based on the block size. For example, M=(W+H)>>t, N=(W+H)>>r. Here the t and r are quantity of right shift bits, such as 2, 3, and 4.

In an alternative implementation, if (W+H)>T1, then M and N are set as particular values $M_1$, $N_1$. Otherwise, M and N are set as particular values $M_2$, $N_2$. Here $M_1$ and $N_1$ can be equal, or not equal. $M_2$ and $N_2$ can be equal, or not equal. For example, if (W+H)>16, then M=2, N=2. If (W+H)<=16, then M=1, N=1.

Note that the improved mechanism also can be used in MDLM and MMLM.

Fourth Improved Mechanism: (Actively, More than One Points Based on Luma Value Threshold), More than One Bigger/Smaller Points Will be Used, Using Mean Value In the fourth improved mechanism, N points will be used to calculate the maximum luma value and the corresponding chroma value. The selected N points with luma value are within a range of [MaxlumaValue−$T_1$, MaxlumaValue]. The mean luma value of the selected N points will be used as the maximum luma value, and the mean chroma value of the selected N points will be used as the chroma value corresponding to the maximum luma value. In an example, the MaxlumaValue represents the maximum luma value in the set P.

In the fourth improved mechanism, M points will be used to calculate the minimum luma value and the corresponding chroma value. The selected M points with luma value are within a range of [MinlumaValue, MinlumaValue+$T_2$]. The mean luma value of the selected M points will be used as the minimum luma value, and the mean chroma value of the selected M points will be used as the chroma value corresponding to the minimum luma value. In an example, the MinlumaValue represents the minimum luma value in the set P.

For example, if the $5^{th}$, $7^{th}$, $8^{th}$, $9^{th}$, $11^{th}$ points are the points with luma value within a range of $[L_{max}-T_1, L_{max}]$. The $4^{th}$, $6^{th}$, $14^{th}$, $18^{th}$ points are the points with luma value within a range of $[L_{min}, L_{min}+T_2]$. In an example, the Lm represents the largest luma value in the set P, and $L_{min}$ represents the smallest luma value in the set P. Then the mean value of $p_5$, $p_7$, $p_8$, $p_9$ and $p_{11}$ is the maximum luma value used for linear model parameter, and the mean value of $q_5$, $q_7$, $q_8$, $q_9$ and $q_{11}$ is the maximum chroma value corresponding to the maximum luma value. Then the mean value of $p_4$, $p_6$, $p_{14}$ and $p_{18}$ is the minimum luma value used for linear model parameter, and the mean value of $q_4$, $q_6$, $q_{14}$ and $q_{18}$ is the minimum chroma value corresponding to the minimum luma value.

Note that M and N can be equal, or not equal.

Not that $T_1$ and $T_2$ can be equal, or not equal.

Note that the improved mechanism also can be used in MDLM and MMLM.

Fifth Improved Mechanism: Using Extended Neighboring Samples

In the existing mechanism, only the top and the left neighboring samples are used to obtain the couple of points for searching the couple of points to derive the linear model parameter. In the fifth improved mechanism, some extended samples can be used to increase the number of couple of points, to improve the robustness of the linear model parameters.

For example, the top-right neighboring samples and the left-below neighboring samples are also used to derive the linear model parameters.

Figure 20:
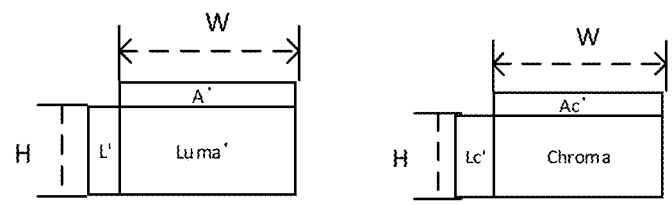
FIG. 20 is a schematic diagram illustrating example mechanisms using neighboring top and left samples to support cross-component intra-prediction.

For example, as shown in FIG. 20, in the existing single mode CCLM mechanism, the down-sampled top neighboring luma samples are represented by A', and the down-sampled left neighboring luma samples are represented by L'. The top neighboring chroma samples are represented by Ac', and the left neighboring chroma samples are represented by Lc'.

Figure 21:
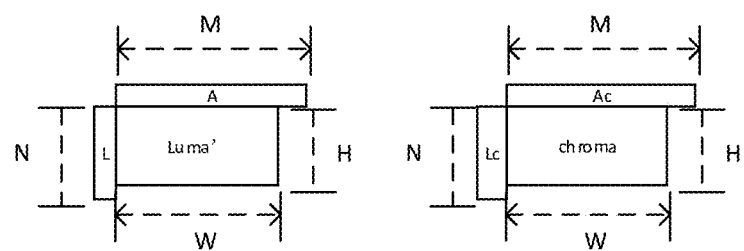
FIG. 21 is a schematic diagram illustrating example mechanisms using extended samples to support cross-component intra-prediction.

As shown in FIG. 21, in the fifth improved mechanism, the neighboring samples will be extended to top-right and the left-below samples. This means that the reference samples A, L, and Ac, Lc may be used to obtain the max/min luma value and the corresponding chroma value.

Here M>W, N>H.

Here note that, the improved mechanism also can be used in MDLM and MMLM.

In the existing CCIP or LM mechanism, to obtain the max/min luma value and the corresponding chroma value, only one pair of points will be used.

In the proposed improved mechanisms, not only one pair of points will be used.

If more than one points have maximum value or more than one points have minimum value, then the pair of points will be chosen based on the chroma value of the corresponding points.

If more than one points have maximum value or more than one points have minimum value, then the corresponding chroma value for maximum luma value will be the mean chroma value of the luma samples with the maximum value, and the corresponding chroma value for minimum luma value will be the mean chroma value of the luma samples with the minimum value.

Not only one pair of points will be chosen. Specifically, the N points which have the larger value, and the M points which have the smaller value will be used to derive the linear model parameters.

Not only one pair of points will be chosen. Specifically, the N points with values within a range of [MaxValue-$T_1$, MaxValue], and the M points with values within a range of [MinValue, MinValue+$T_2$] will be chosen as the points to derive the linear model parameters.

Not only the above and left neighboring samples are used to obtain the max/min values, but also some extended neighboring samples are used, like the below left neighboring samples and top right neighboring samples.

All the improved mechanisms mentioned above will obtain the more robust linear model parameters.

All the improved mechanisms mentioned above can also be used in MMLM.

All the improved mechanisms mentioned above, except the improved mechanism 5, can also be used in MDLM.

Note that the improved mechanisms proposed in the present disclosure are used to obtain the max/min luma values and the corresponding chroma values for deriving the linear model parameters for chroma intra prediction. The improved mechanisms are applied into the intra prediction module or the intra process. Therefore, it exists in both decoder side and encoder side. Also, the improved mechanisms to obtain the max/min luma values and the corresponding chroma values may be implemented in the same way in both encoder and decoder.

For a chroma block, in order to obtain its prediction using the LM mode, the corresponding down-sampled luma samples are obtained first, then the max/min luma values and the corresponding chroma values in the reconstructed neighboring samples are obtained to derive the linear model parameters. Then, the prediction (i.e. a predictive block) of current chroma block is obtained using the derived linear model parameters and the down-sampled luma block.

A method for cross-component prediction of a block according to embodiment 1 of the present disclosure is related to the first improved mechanism described above.

A method for cross-component prediction of a block according to embodiment 2 of the present disclosure is related to the second improved mechanism described above.

A method for cross-component prediction of a block according to embodiment 3 of the present disclosure is related to the third improved mechanism described above.

A method for cross-component prediction of a block according to embodiment 4 of the present disclosure is related to the fourth improved mechanism described above.

A method for cross-component prediction of a block according to embodiment 5 of the present disclosure is related to the fifth improved mechanism described above.

Figure 22:
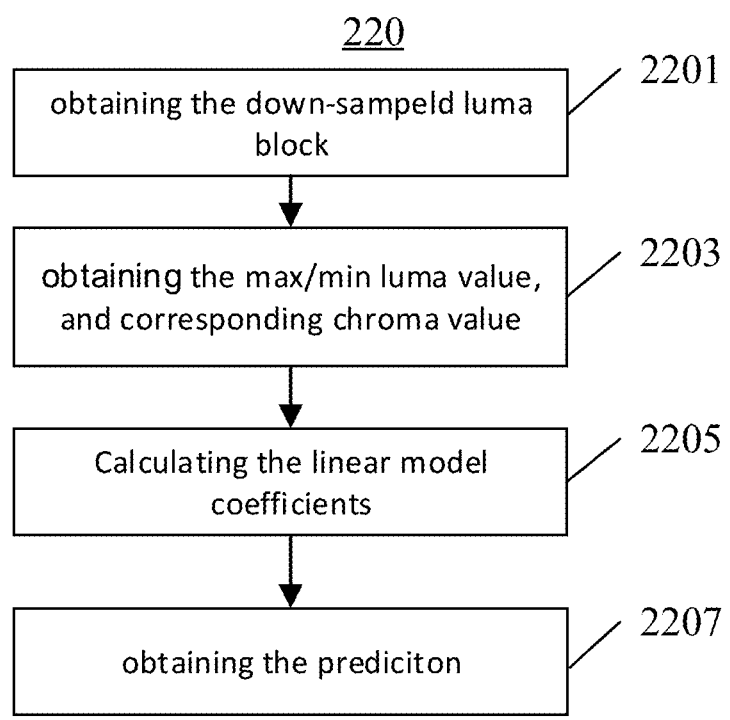
FIG. 22 is a flowchart of a method of a cross-component linear model (CCLM) prediction according to some embodiments of the present disclosure.

FIG. 22 is a flowchart of another example method 220 for cross-component prediction of a block (e.g. a chroma block) according to some embodiments of the present disclosure. Hence, the method can be may be performed by a video encoder 20 and/or a video decoder 30 of a codec system 10 or 40. In particular, the method can be performed by an intra prediction unit 46 of the video encoder 20, and/or an intra prediction unit 74 of the video decoder 30.

At step 2210, a down-sampled luma block is obtained. It can be understood that the spatial resolution of the luma block is usually larger than the chroma block, a luma block (i.e. a reconstructed luma block) is down-sampled to obtain a down-sampled luma block. The luma block 911, 1211, 1311, 1411, and 1511 corresponds to a chroma block 901, as illustrated in FIGS. 9 and 12-15.

At step 2230, a maximum luma value and a minimum luma value are determined from a set of down-sampled samples of reconstructed neighboring luma samples, wherein the reconstructed neighboring luma samples include a plurality of reconstructed luma samples that are above the luma block and/or a plurality of reconstructed luma samples that are left to the luma block, and corresponding chroma value are also determined.

At step 2250, linear model parameters are calculated. For example, the linear model parameters are calculated based on the maximum luma value and the corresponding chroma value, and the minimum luma value and the corresponding chroma value using equation (13) and equation (14).

At step 2270, a predictive block of the chroma block 901 is obtained at least based on the one or more linear model parameters. The predicted chroma values of the chroma block 901 are generated based on the one or more linear model parameters and the down-sampled luma block 1212, 1312, 1412, 1512. The predicted chroma values of the chroma block 901 is derived using the equation (1).

The method for cross-component prediction of a block according to embodiment 1 (corresponding to the first improved mechanism for LM mode) of the present disclosure is provided by reference with FIG. 22.

The first improved mechanism described above will be used to derive the max/min luma values, and the corresponding chroma values. If more than one points have the max/min value, then the couple of points will be chosen based on the chroma value of the corresponding points. The couple of points (which have max/min luma value) which have the smallest chroma value difference will be chosen as the couple of points to derive the linear model parameter.

Note that, besides using the smallest value of chroma value difference, the first improved mechanism can also use the biggest value of the chroma value difference.

For details, please refer to the improved mechanism 1 presented above.

The improved mechanism 1 can also be used in MDLM and MMLM. For example, to MDLM/MMLM, only the max/min luma value and corresponding chroma value are used to deriving the linear model parameters. The improved mechanism 1 is used to deriving the max/min luma values and corresponding chroma values.

The method for cross-component prediction of a block according to embodiment 2 (corresponding to the second improved mechanism for LM mode) of the present disclosure is provided by reference with FIG. 22.

The difference between the embodiment 2 and the embodiment 1 lies in:

If more than one points have the max/min value, then the mean chroma value will be used. The chroma value corresponding to the maximum luma value is the mean chroma value of the points with maximum luma value. The chroma value corresponding to the minimum luma value is the mean chroma value of the points with minimum luma value.

For details, please refer to improved mechanism 2.

The improved mechanism can also be used in MDLM and MMLM. For example, to MDLM/MMLM, only the max/min luma value and corresponding chroma value are used to deriving the linear model parameters. The improved mechanism 2 is used to derive the max/min luma values and corresponding chroma values.

The method for cross-component prediction of a block according to embodiment 3 (corresponding to the third improved mechanism) of the present disclosure is provided by reference with FIG. 22.

The difference between the embodiment 3 and the embodiment 1 lies in:

N points will be used to calculate the maximum luma value, and the corresponding chroma value. The selected N points have bigger luma value than other points. The mean luma value of the selected N points will be used as the maximum luma value, and the mean chroma value of the selected N points will be used as the chroma value corresponding to the maximum luma value.

M points will be used to calculate the minimum luma value, and the corresponding chroma value. The selected M points have smaller luma values than other points. The mean luma value of the selected M points will be used as the minimum luma value, and the mean chroma value of the selected M points will be used as the chroma value corresponding to the minimum luma value.

For details, please refer to the improved mechanism 3 described above.

The improved mechanism 3 can also be used in MDLM and MMLM. For example, to MDLM/MMLM, only the max/min luma values and corresponding chroma values are used for deriving the linear model parameters. The improved mechanism 3 is used for deriving the max/min luma values and corresponding chroma values.

The method for cross-component prediction of a block according to embodiment 4 (corresponding to the fourth improved mechanism) of the present disclosure is provided by reference with FIG. 22.

The difference between the embodiment 4 and the embodiment 1 lies in:

N couples of points will be used to calculate the maximum luma value, and the corresponding chroma value. The selected N couples of points have luma values within a range of [MaxlumaValue−$T_1$, MaxlumaValue]. The mean luma value of the selected N couples of points will be used as the maximum luma value, and the mean chroma value of the selected N couples of points will be used as the chroma value corresponding to the maximum luma value.

M couples of points will be used to calculate the minimum luma value, and the corresponding chroma value. The selected M couples of points have luma values within a range of [MinlumaValue, MinlumaValue+$T_2$]. The mean luma value of the selected M couples of points will be used as the minimum luma value, and the mean chroma value of the selected M couples of points will be used as the chroma value corresponding to the minimum luma value.

For details, please refer to the improved mechanism 4 described above.

The improved mechanism 4 can also be used in MDLM and MMLM. For example, to MDLM/MMLM, only the max/min luma value and corresponding chroma value are used for deriving the linear model parameters. The improved mechanism 4 is used for deriving the max/min luma value and corresponding chroma value.

The method for cross-component prediction of a block according to embodiment 5 (corresponding to the fifth improved mechanism) of the present disclosure is provided by reference with FIG. 22.

The difference between the embodiment 5 and the embodiment 1 lies in:

Some extended samples can be used to increase the number of couple of points, to improve the robustness of the linear model parameters.

For example, the top-right neighboring samples and the left-below neighboring samples are also used to derive the linear model parameters.

For details, please refer to improved mechanism 5 described above.

The improved mechanism 5 can also be used in MMLM. For example, for MMLM, only the max/min luma value and corresponding chroma value are used for deriving the linear model parameters. The improved mechanism 5 is used for deriving the max/min luma values and corresponding chroma values.

Figure 23:
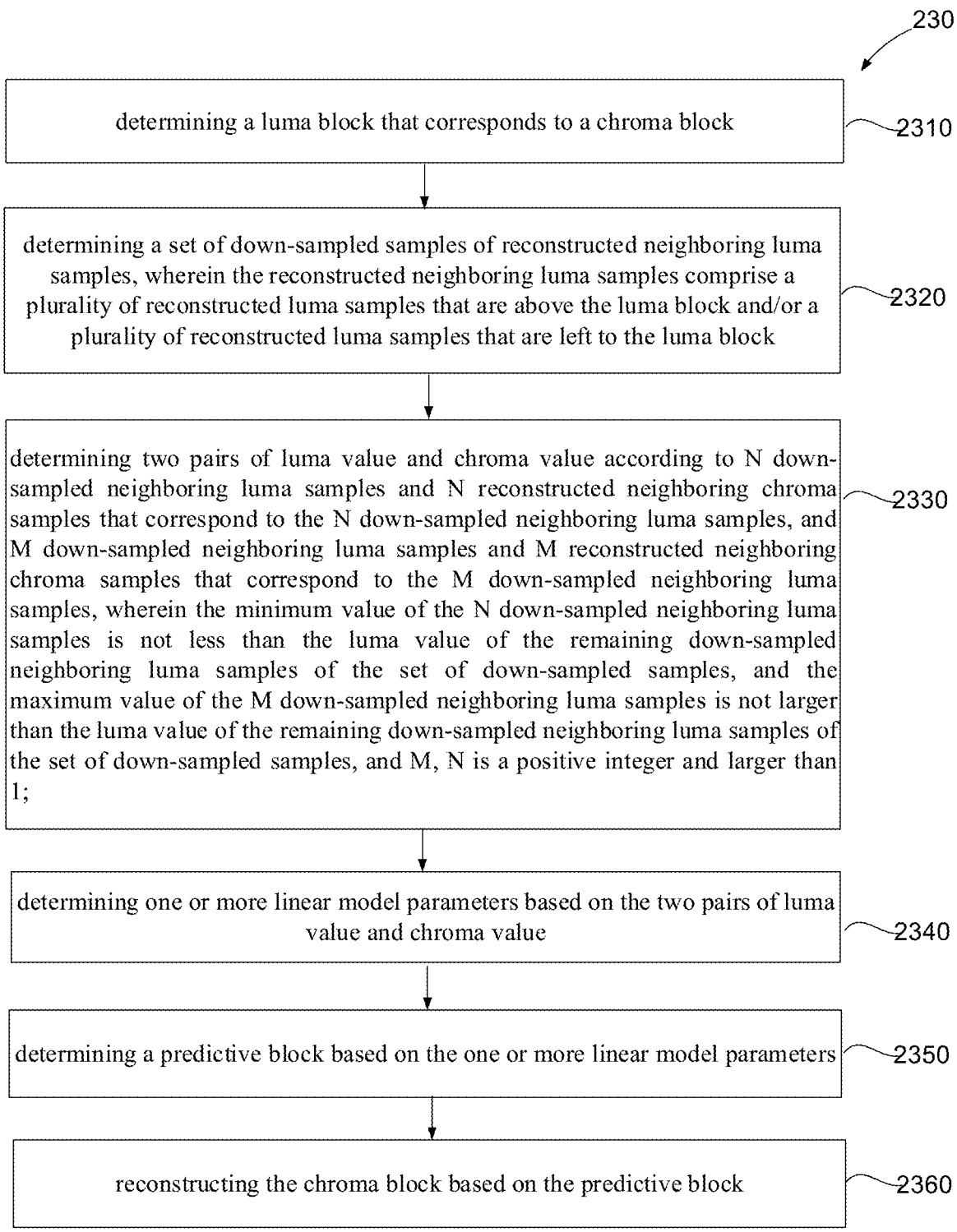
FIG. 23 is a flowchart of a method of decoding video data using a cross-component linear model (CCLM) prediction according to an embodiment of the present disclosure.

FIG. 23 is a flowchart of an example method 230 of decoding video data. At step 2310, a luma block 911, 1211, 1311, 1411, and 1511 that corresponds to a chroma block 901 is determined.

At step 2320, a set of down-sampled samples of reconstructed neighboring luma samples is determined, wherein the reconstructed neighboring luma samples include a plurality of reconstructed luma samples that are above the luma block and/or a plurality of reconstructed luma samples that are left to the luma block.

At step 2330, two pairs of luma value and chroma value are determined according to N down-sampled neighboring luma samples and N reconstructed neighboring chroma samples that correspond to the N down-sampled neighboring luma samples, and/or M down-sampled neighboring luma samples and M reconstructed neighboring chroma samples that correspond to the M down-sampled neighboring luma samples. The minimum value of the N down-sampled neighboring luma samples is not less than the luma value of the remaining down-sampled neighboring luma samples of the set of down-sampled samples of reconstructed neighboring luma samples, and the maximum value of the M down-sampled neighboring luma samples is not larger than the luma value of the remaining down-sampled neighboring luma samples of the set of down-sampled samples of reconstructed neighboring luma samples, and M, N is a positive integer and larger than 1. In particular, a first pair of luma value and chroma value is determined according to N down-sampled neighboring luma samples of the set of down-sampled samples and N reconstructed neighboring chroma samples that correspond to the N down-sampled neighboring luma samples; a second pair of luma value and chroma value is determined according to M down-sampled neighboring luma samples of the set of down-sampled samples and M reconstructed neighboring chroma samples that correspond to the M down-sampled neighboring luma samples.

At step 2340, one or more linear model parameters are determined based on the two pairs of luma value and chroma value.

At step 2350, a predictive block of the chroma block 901 is determined at least based on the one or more linear model parameters, for example, predicted chroma values of the chroma block 901 are generated based on the linear model parameters and the down-sampled luma block 1212, 1312, 1412, and 1512.

At step 2360, the chroma block 901 is reconstructed based on the predictive block. For example, adding the predictive block to a residual block to reconstruct the chroma block 901.

It should be noted that in the case of MDLM intra-prediction using CCIP_A mode 1700, the set of reconstructed neighboring luma samples include a plurality of reconstructed luma samples that are above the luma block but does not include a plurality of reconstructed luma samples that are left to the luma block. In the case of MDLM intra-prediction using CCIP_L mode 1800, the set of reconstructed neighboring luma samples does not include a plurality of reconstructed luma samples that are above the luma block and include a plurality of reconstructed luma samples that are left to the luma block. In the case of CCLM intra-prediction, the set of reconstructed neighboring luma samples include a plurality of reconstructed luma samples that are above the luma block and a plurality of reconstructed luma samples that are left to the luma block.

Figure 24:
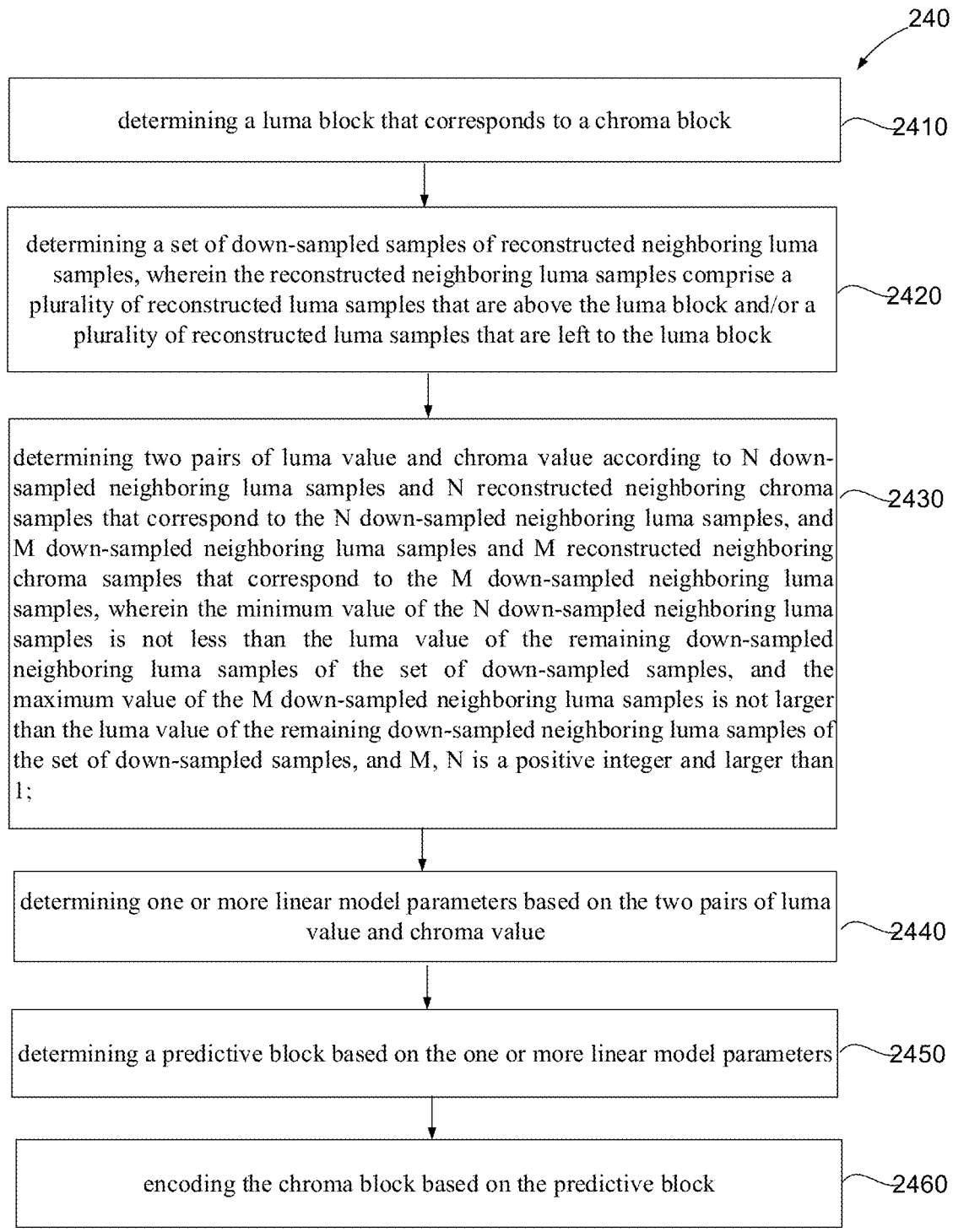
FIG. 24 is a flowchart of a method of encoding video data using a cross-component linear model (CCLM) prediction according to an embodiment of the present disclosure.

FIG. 24 is a flowchart of an example method 240 of encoding video data. At step 2410, a luma block 911, 1211, 1311, 1411, and 1511 that corresponds to a chroma block 901 is determined.

At step 2420, a set of down-sampled samples of reconstructed neighboring luma samples is determined, wherein the reconstructed neighboring luma samples include a plurality of reconstructed luma samples that are above the luma block and/or a plurality of reconstructed luma samples that are left to the luma block.

At step 2430, two pairs of luma value and chroma value are determined according to N down-sampled neighboring luma samples and N reconstructed neighboring chroma samples that correspond to the N down-sampled neighboring luma samples, and/or M down-sampled neighboring luma samples and M reconstructed neighboring chroma samples that correspond to the M down-sampled neighboring luma samples. The minimum value of the N down-sampled neighboring luma samples is not less than the luma value of the remaining down-sampled neighboring luma samples of the set of down-sampled samples of reconstructed neighboring luma samples. The maximum value of the M down-sampled neighboring luma samples is not larger than the luma value of the remaining down-sampled neighboring luma samples of the set of down-sampled samples of reconstructed neighboring luma samples, and M, N is a positive integer and larger than 1. In particular, a first pair of luma value and chroma value is determined according to N down-sampled neighboring luma samples of the set of down-sampled samples and N reconstructed neighboring chroma samples that correspond to the N down-sampled neighboring luma samples; a second pair of luma value and chroma value is determined according to M down-sampled neighboring luma samples of the set of down-sampled samples and M reconstructed neighboring chroma samples that correspond to the M down-sampled neighboring luma samples.

At step 2440, one or more linear model parameters are determined based on the two pairs of luma value and chroma value.

At step 2450, a predictive block of the chroma block 901 is determined based on the one or more linear model parameters, for example, predicted chroma values of the chroma block 901 are generated based on the linear model parameters and the down-sampled luma block 1212, 1312, 1412, and 1512.

At step 2460, the chroma block 901 is encoded based on the predictive block. Residual data between the chroma block and the predictive block is encoded and a bitstream including the encoded residual data is generated. For example, subtracting the predictive block from the chroma block 901 to obtain a residual block (residual data) and generating a bitstream including the encoded residual data.

It should be noted that in the case of MDLM intra-prediction using CCIP_A mode 1700, the set of reconstructed neighboring luma samples includes a plurality of reconstructed luma samples that are above the luma block but does not include a plurality of reconstructed luma samples that are left to the luma block. In the case of MDLM intra-prediction using CCIP_L mode 1800, the set of reconstructed neighboring luma samples does not include a plurality of reconstructed luma samples that are above the luma block and includes a plurality of reconstructed luma samples that are left to the luma block. In the case of CCLM intra-prediction, the set of reconstructed neighboring luma samples include a plurality of reconstructed luma samples that are above the luma block and a plurality of reconstructed luma samples that are left to the luma block CCLM intra-prediction.

Figure 25:
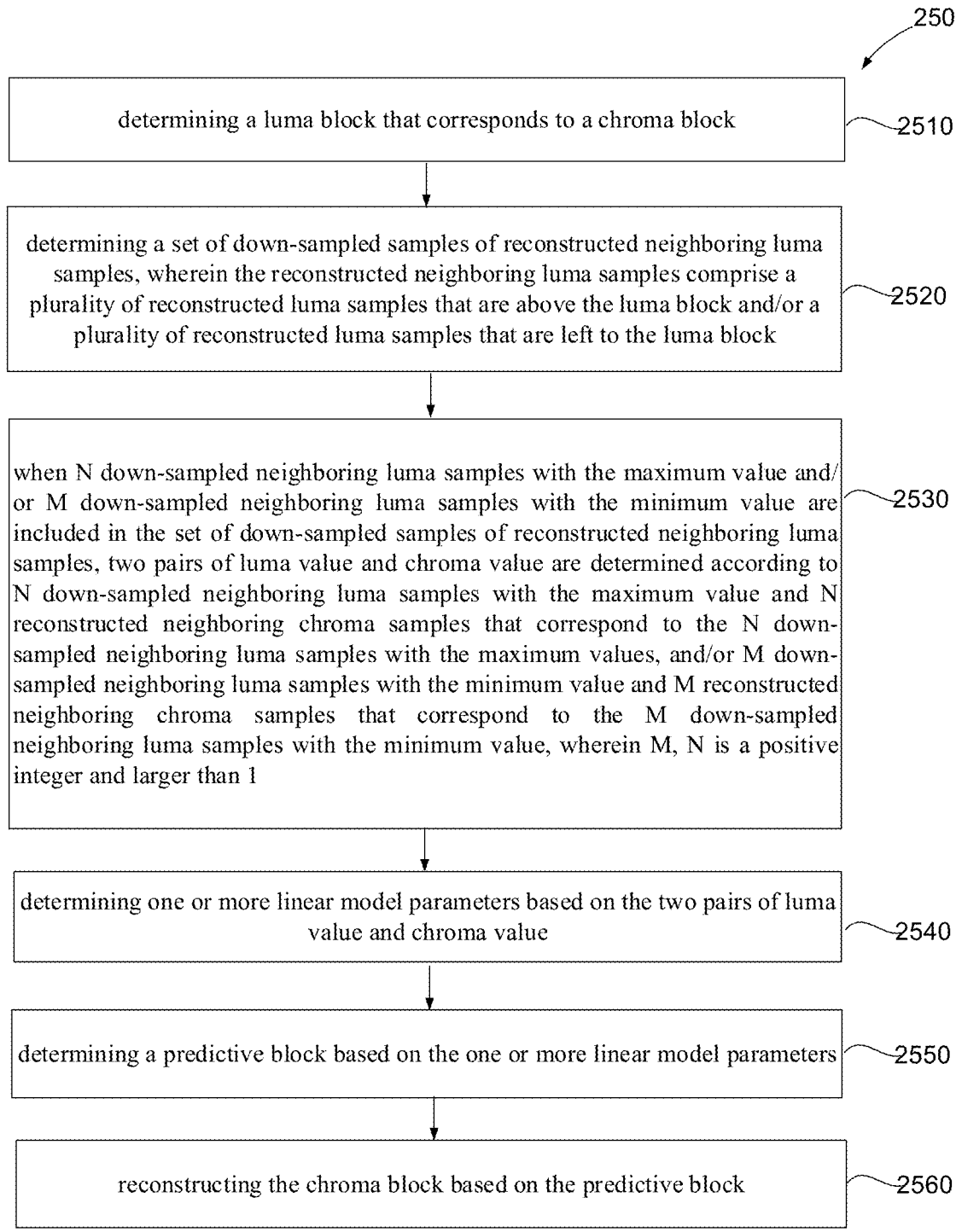
FIG. 25 is a flowchart of a method of decoding video data using a cross-component linear model (CCLM) prediction according to another embodiment of the present disclosure.

FIG. 25 is a flowchart of an example method 250 of decoding video data. At step 2510, a luma block 911 that corresponds to a chroma block 901 is determined.

At step 2520, a set of down-sampled samples of reconstructed neighboring luma samples is determined, wherein the reconstructed neighboring luma samples include a plurality of reconstructed luma samples that are above the luma block and/or a plurality of reconstructed luma samples that are left to the luma block.

At step 2530, when N down-sampled neighboring luma samples with the maximum value and/or M down-sampled neighboring luma samples with the minimum value are included in the set of down-sampled samples of reconstructed neighboring luma samples, two pairs of luma value and chroma value are determined according to N down-sampled neighboring luma samples with the maximum value and N reconstructed neighboring chroma samples that correspond to the N down-sampled neighboring luma samples with the maximum values, and/or M down-sampled neighboring luma samples with the minimum value and M reconstructed neighboring chroma samples that correspond to the M down-sampled neighboring luma samples with the minimum value, wherein M, N is a positive integer and larger than 1. In particular, two pairs of luma value and chroma value are determined according to at least one of the following:

1. N down-sampled neighboring luma samples with the maximum value and N reconstructed neighboring chroma samples that correspond to the N down-sampled neighboring luma samples with the maximum values, and one down-sampled neighboring luma sample with the minimum value and one reconstructed neighboring chroma sample that correspond to the down-sampled neighboring luma sample with the minimum value;
2. one down-sampled neighboring luma sample with the maximum value and one reconstructed neighboring chroma sample that correspond to the down-sampled neighboring luma sample with the maximum values, and M down-sampled neighboring luma samples with the minimum value and M reconstructed neighboring chroma samples that correspond to the M down-sampled neighboring luma samples with the minimum value; and
3. N down-sampled neighboring luma samples with the maximum value and N reconstructed neighboring chroma samples that correspond to the N down-sampled neighboring luma samples with the maximum values, and M down-sampled neighboring luma samples with the minimum value and M reconstructed neighboring chroma samples that correspond to the M down-sampled neighboring luma samples with the minimum value, wherein M, N is a positive integer and larger than 1.

At step 2540, one or more linear model parameters are determined based on the two pairs of luma value and chroma value.

At step 2550, a predictive block is determined based on the one or more linear model parameters, for example, predicted chroma values of the chroma block 901 are generated based on the linear model parameters and the down-sampled luma block 1212, 1312, 1412, and 1512.

At step 2560, the chroma block 901 is reconstructed based on the predictive block. For example, adding the predictive block to a residual block to reconstruct the chroma block 901.

It should be noted that in the case of MDLM intra-prediction using CCIP_A mode 1700, the set of reconstructed neighboring luma samples includes a plurality of reconstructed luma samples that are above the luma block but does not include a plurality of reconstructed luma samples that are left to the luma block. In the case of MDLM intra-prediction using CCIP_L mode 1800, the set of reconstructed neighboring luma samples does not include a plurality of reconstructed luma samples that are above the luma block and includes a plurality of reconstructed luma samples that are left to the luma block. In the case of CCLM intra-prediction, the set of reconstructed neighboring luma samples includes a plurality of reconstructed luma samples that are above the luma block and a plurality of reconstructed luma samples that are left to the luma block CCLM intra-prediction.

Figure 26:
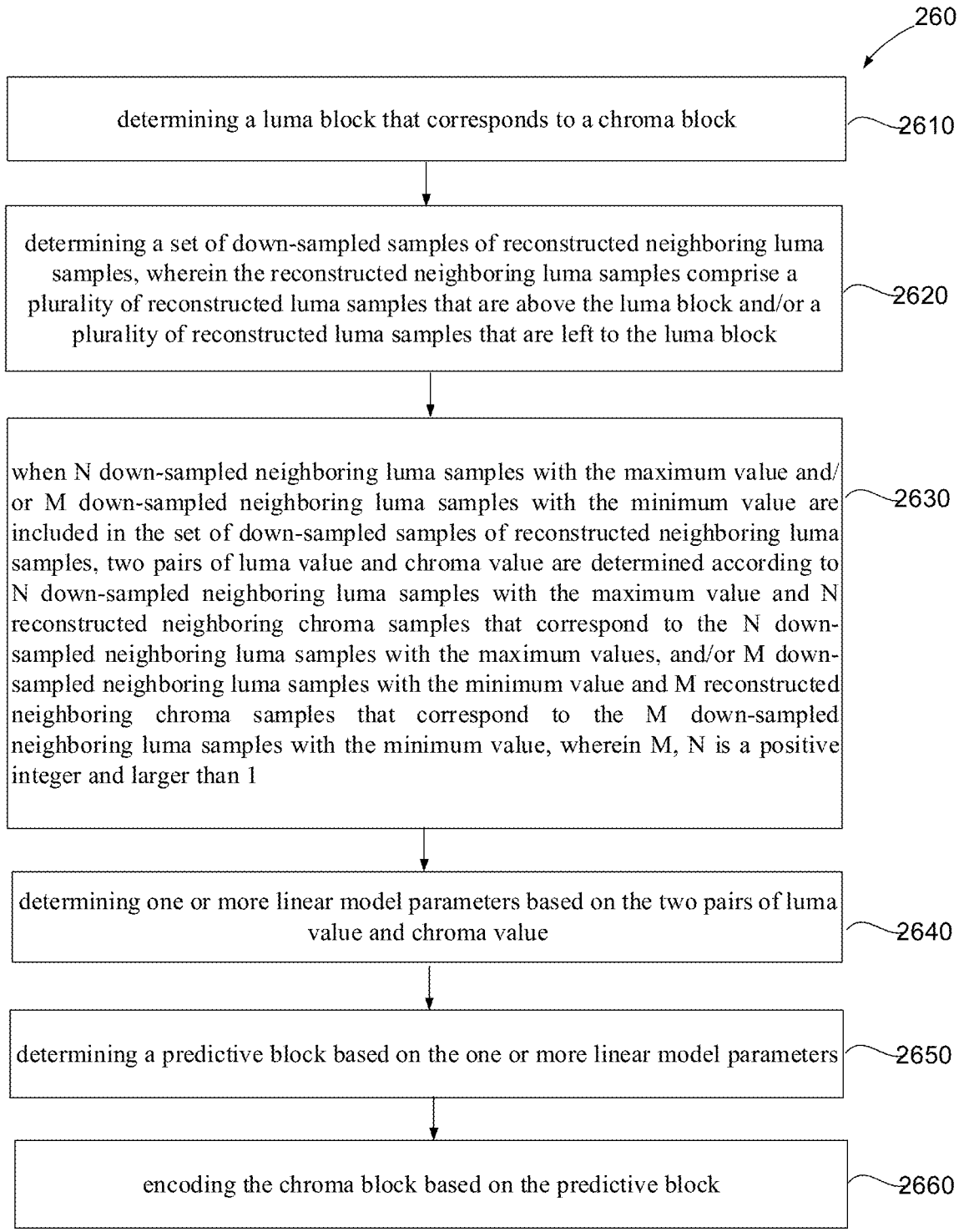
FIG. 26 is a flowchart of a method of encoding video data using a cross-component linear model (CCLM) prediction according to another embodiment of the present disclosure.

FIG. 26 is a flowchart of an example method 260 of encoding video data. At step 2610, a luma block 911 that corresponds to a chroma block 901 is determined.

At step 2620, a set of down-sampled samples of reconstructed neighboring luma samples is determined, wherein the reconstructed neighboring luma samples include a plurality of reconstructed luma samples that are above the luma block and/or a plurality of reconstructed luma samples that are left to the luma block.

At step 2630, when N down-sampled neighboring luma samples with the maximum value and/or M down-sampled neighboring luma samples with the minimum value are included in the set of down-sampled samples of reconstructed neighboring luma samples, two pairs of luma value and chroma value are determined according to N down-sampled neighboring luma samples with the maximum value and N reconstructed neighboring chroma samples that correspond to the N down-sampled neighboring luma samples with the maximum values, and/or M down-sampled neighboring luma samples with the minimum value and M reconstructed neighboring chroma samples that correspond to the M down-sampled neighboring luma samples with the minimum value, wherein M, N is a positive integer and larger than 1. In particular, two pairs of luma value and chroma value are determined according to at least one of the following:

1. N down-sampled neighboring luma samples with the maximum value and N reconstructed neighboring chroma samples that correspond to the N down-sampled neighboring luma samples with the maximum values, and one down-sampled neighboring luma sample with the minimum value and one reconstructed neighboring chroma sample that correspond to the down-sampled neighboring luma sample with the minimum value;

2. one down-sampled neighboring luma sample with the maximum value and one reconstructed neighboring chroma sample that correspond to the down-sampled neighboring luma sample with the maximum values, and M down-sampled neighboring luma samples with the minimum value and M reconstructed neighboring chroma samples that correspond to the M down-sampled neighboring luma samples with the minimum value; and 3. N down-sampled neighboring luma samples with the maximum value and N reconstructed neighboring chroma samples that correspond to the N down-sampled neighboring luma samples with the maximum values, and M down-sampled neighboring luma samples with the minimum value and M reconstructed neighboring chroma samples that correspond to the M down-sampled neighboring luma samples with the minimum value, wherein M, N is a positive integer and larger than 1.

At step 2640, one or more linear model parameters are determined based on the two pairs of luma value and chroma value.

At step 2650, a predictive block of the chroma block 901 is determined based on the one or more linear model parameters, for example, predicted chroma values of the chroma block 901 are generated based on the linear model parameters and the down-sampled luma block 1212, 1312, 1412, and 1512.

At step 2660, the chroma block 901 is encoded based on the predictive block. Residual data between the chroma block and the predictive block is encoded and a bitstream including the encoded residual data is generated. For example, subtracting the predictive block from the chroma block 901 to obtain a residual block (residual data) and generating a bitstream including the encoded residual data.

It should be noted that in the case of MDLM intra-prediction using CCIP_A mode 1700, the set of reconstructed neighboring luma samples include a plurality of reconstructed luma samples that are above the luma block but does not include a plurality of reconstructed luma samples that are left to the luma block. In the case of MDLM intra-prediction using CCIP_L mode 1800, the set of reconstructed neighboring luma samples does not include a plurality of reconstructed luma samples that are above the luma block and include a plurality of reconstructed luma samples that are left to the luma block. In the case of CCLM intra-prediction, the set of reconstructed neighboring luma samples include a plurality of reconstructed luma samples that are above the luma block and a plurality of reconstructed luma samples that are left to the luma block CCLM intra-prediction.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding video data implemented by a decoding device, comprising:
   performing entropy decoding on a bitstream, to obtain information indicating a selected intra-prediction mode;
   determining a luma block that corresponds to a chroma block;
   determining a set of down-sampled samples of reconstructed neighboring luma samples, wherein the selected intra-prediction mode is a cross-component intra prediction_A (CCIP_A) mode, the reconstructed neighboring luma samples comprise a plurality of reconstructed luma samples that are above the luma block without including a plurality of reconstructed luma samples that are left to the luma block;
   determining a first pair of luma value and chroma value according to N down-sampled neighboring luma samples of the set of down-sampled samples and N reconstructed neighboring chroma samples that correspond to the N down-sampled neighboring luma samples, wherein N is a positive integer greater than 1, and a minimum luma value of the N down-sampled neighboring luma samples is not less than respective luma values of first remaining down-sampled neighboring luma samples of the set, wherein the first remaining down-sampled neighboring luma samples are different from the N down-sampled neighboring luma samples;
   determining a second pair of luma value and chroma value according to M down-sampled neighboring luma samples of the set of down-sampled samples and M reconstructed neighboring chroma samples that correspond to the M down-sampled neighboring luma samples, wherein M is a positive integer greater than 1, and a maximum luma value of the M down-sampled neighboring luma samples is not more than respective luma values of second remaining down-sampled neighboring luma samples of the set, wherein the second remaining down-sampled neighboring luma samples are different from the M down-sampled neighboring luma samples;
   deriving one or more linear model parameters based on the first pair of luma value and chroma value and the second pair of luma value and chroma value;
   generating a predictive block based on the one or more linear model parameters; and
   reconstructing the chroma block based on the predictive block.

2. The method of claim 1, wherein the set of down-sampled samples of reconstructed neighboring luma samples consists of the N down-sampled neighboring luma samples and the M down-sampled neighboring luma samples, and the sum of N and M is equal to the number of down-sampled neighboring luma samples in the set.

3. A device of decoding video data, comprising:
   a memory containing programming instructions; and
   one or more processors in communication with the memory,
   wherein the one or more processors are configured to execute the programming instructions to cause the device to:
   perform entropy decoding on a bitstream, to obtain information indicating a selected intra-prediction mode;
   determine a luma block that corresponds to a chroma block;
   determine a set of down-sampled samples of reconstructed neighboring luma samples,
   wherein the selected intra-prediction mode is a cross-component intra prediction_A (CCIP_A) mode, the reconstructed neighboring luma samples comprise a plurality of reconstructed luma samples that are above the luma block without including a plurality of reconstructed luma samples that are left to the luma block;
     determine a first pair of luma value and chroma value according to N down-sampled neighboring luma samples of the set of down-sampled samples and N reconstructed neighboring chroma samples that correspond to the N down-sampled neighboring luma samples; wherein N is a positive integer and larger than 1, and the minimum luma value of the N down-sampled neighboring luma samples is not less than respective luma values of first remaining down-sampled neighboring luma samples of the set, wherein the first remaining down-sampled neighboring luma samples are different from the N down-sampled neighboring luma samples;
     determine a second pair of luma value and chroma value according to M down-sampled neighboring luma samples of the set of down-sampled samples and M reconstructed neighboring chroma samples that correspond to the M down-sampled neighboring luma samples, wherein M is a positive integer greater than 1, and the maximum luma value of the M down-sampled neighboring luma samples is not more than respective luma values of second remaining down-sampled neighboring luma samples of the set, wherein the second remaining down-sampled neighboring luma samples are different from the M down-sampled neighboring luma samples;
     derive one or more linear model parameters based on the first pair of luma value and chroma value and the second pair of luma value and chroma value;
     generate a predictive block based on the one or more linear model parameters; and
     reconstruct the chroma block based on the predictive block.

4. The device of claim 3, wherein the set of down-sampled samples of reconstructed neighboring luma samples consists of the N down-sampled neighboring luma samples and the M down-sampled neighboring luma samples, and the sum of N and M is equal to the number of down-sampled neighboring luma samples in the set.

5. A non-transitory computer readable medium storing computer instructions which, when executed by a processor in a device, cause the device to perform the steps of:
   performing entropy decoding on a bitstream, to obtain information indicating a selected intra-prediction mode;

determining a luma block that corresponds to a chroma block;

determining a set of down-sampled samples of reconstructed neighboring luma samples, wherein the selected intra-prediction mode is a cross-component intra prediction_A (CCIP_A) mode, the reconstructed neighboring luma samples comprise a plurality of reconstructed luma samples that are above the luma block without including a plurality of reconstructed luma samples that are left to the luma block;

determining a first pair of luma value and chroma value according to N down-sampled neighboring luma samples of the set of down-sampled samples and N reconstructed neighboring chroma samples that correspond to the N down-sampled neighboring luma samples, wherein N is a positive integer greater than 1, and a minimum luma value of the N down-sampled neighboring luma samples is not less than respective luma values of first remaining down-sampled neighboring luma samples of the set, wherein the first remaining down-sampled neighboring luma samples are different from the N down-sampled neighboring luma samples;

determining a second pair of luma value and chroma value according to M down-sampled neighboring luma samples of the set of down-sampled samples and M reconstructed neighboring chroma samples that correspond to the M down-sampled neighboring luma samples, wherein M is a positive integer greater than 1, and a maximum luma value of the M down-sampled neighboring luma samples is not more than respective luma values of second remaining down-sampled neighboring luma samples of the set, wherein the second remaining down-sampled neighboring luma samples are different from the M down-sampled neighboring luma samples;

deriving one or more linear model parameters based on the first pair of luma value and chroma value and the second pair of luma value and chroma value;

generating a predictive block based on the one or more linear model parameters; and reconstructing the chroma block based on the predictive block.

6. The non-transitory computer readable medium of claim 5, wherein the set of down-sampled samples of reconstructed neighboring luma samples consists of the N down-sampled neighboring luma samples and the M down-sampled neighboring luma samples, and the sum of N and M is equal to the number of down-sampled neighboring luma samples in the set.

7. The method of claim 1, wherein
the luma value of the first pair of luma value and chroma value is the mean luma value of the N down-sampled neighboring luma samples, and
the chroma value of the first pair of luma value and chroma value is the mean chroma value of the N reconstructed neighboring chroma samples that correspond to the N down-sampled neighboring luma samples,
and wherein
the luma value of the second pair of luma value and chroma value is the mean luma value of the M down-sampled neighboring luma samples, and
the chroma value of the second pair of luma value and chroma value is the mean chroma value of the M reconstructed neighboring chroma samples that correspond to the M down-sampled neighboring luma samples.

8. The method of claim 1, wherein M is equal to N.

9. The method of claim 8, wherein M=N=2.

10. The method of claim 1, wherein the reconstructed neighboring luma samples comprise:
a top-right neighbouring luma sample outside the luma block and luma samples that are right to the top-right neighbouring luma sample outside the luma block.

11. The method of claim 1, wherein the plurality of reconstructed luma samples that are above the luma block are reconstructed neighboring luma samples adjacent to the respective top boundary.

12. The method of claim 1, wherein the reconstructed neighboring luma samples excludes luma samples that are above of a top-left neighbouring luma sample outside the luma block.

13. The method of claim 1, wherein the set of down-sampled samples of the reconstructed neighboring luma samples are obtained by down-sampling on the reconstructed neighboring luma samples.

14. The device of claim 3, wherein
the luma value of the first pair of luma value and chroma value is the mean luma value of the N down-sampled neighboring luma samples, and
the chroma value of the first pair of luma value and chroma value is the mean chroma value of the N reconstructed neighboring chroma samples that correspond to the N down-sampled neighboring luma samples;
and wherein
the luma value of the second pair of luma value and chroma value is the mean luma value of the M down-sampled neighboring luma samples, and
the chroma value of the second pair of luma value and chroma value is the mean chroma value of the M reconstructed neighboring chroma samples that correspond to the M down-sampled neighboring luma samples.

15. The device of claim 3, wherein M is equal to N.

16. The device of claim 15, wherein M=N=2.

17. The device of claim 3, wherein the reconstructed neighboring luma samples comprise:
a top-right neighbouring luma sample outside the luma block and luma samples that are right to the top-right neighbouring luma sample outside the luma block.

18. The device of claim 3, wherein the plurality of reconstructed luma samples that are above the luma block are reconstructed neighboring luma samples adjacent to the respective top boundary.

19. The device of claim 3, wherein the reconstructed neighboring luma samples excludes luma samples that are above of a top-left neighbouring luma sample outside the luma block.

20. The device of claim 3, wherein the set of down-sampled samples of the reconstructed neighboring luma samples are obtained by down-sampling on the reconstructed neighboring luma samples.

* * * * *